United States Patent
Peake et al.

(10) Patent No.: US 12,056,845 B2
(45) Date of Patent: Aug. 6, 2024

(54) PLANT IDENTIFICATION USING DYNAMIC CROPPING

(71) Applicant: Blue River Technology Inc., Sunnyvale, CA (US)

(72) Inventors: John William Peake, Mountain View, CA (US); Rajesh Radhakrishnan, Mountain View, CA (US)

(73) Assignee: BLUE RIVER TECHNOLOGY INC., Santa Clara, CA (US)

( * ) Notice: Subject to any disclaimer, the term of this patent is extended or adjusted under 35 U.S.C. 154(b) by 360 days.

(21) Appl. No.: 17/405,932

(22) Filed: Aug. 18, 2021

(65) Prior Publication Data

US 2022/0058770 A1 Feb. 24, 2022

Related U.S. Application Data

(60) Provisional application No. 63/068,185, filed on Aug. 20, 2020.

(51) Int. Cl.
*G06T 3/4038* (2024.01)
*A01B 63/00* (2006.01)
*A01B 79/00* (2006.01)
*G06V 20/10* (2022.01)
*G06V 20/56* (2022.01)

(52) U.S. Cl.
CPC .......... *G06T 3/4038* (2013.01); *A01B 63/002* (2013.01); *A01B 79/005* (2013.01); *G06V 20/188* (2022.01); *G06V 20/56* (2022.01)

(58) Field of Classification Search
None
See application file for complete search history.

(56) References Cited

U.S. PATENT DOCUMENTS

| 8,818,029 | B1 | 8/2014 | Mecikalski et al. |
| 9,478,008 | B1 * | 10/2016 | Adsumilli ............. G06T 3/4038 |
| 10,200,638 | B2 * | 2/2019 | Stein ...................... H04N 23/69 |

(Continued)

FOREIGN PATENT DOCUMENTS

WO WO-2020157702 A1 * 8/2020 ........... A01B 79/005

OTHER PUBLICATIONS

I.D. García-Santillán, M. Montalvo, J.M. Guerrero, G. Pajares. Automatic detection of curved and straight crop rows from images in maize fields. Biosyst. Eng., 156 (2017), pp. 61-79, 10.1016/J.BIOSYSTEMSENG.2017.01.013 (Year: 2017).*

(Continued)

*Primary Examiner* — Vu Le
*Assistant Examiner* — Charles C L Penny
(74) *Attorney, Agent, or Firm* — Fenwick & West LLP

(57) ABSTRACT

A farming machine identifies and treats a plant as the farming machine travels through a field. The farming machine includes an array of tiled image sensors for capturing images of the field. A control system identifies an active region in the captured images and generates a tiled (Continued)

image that includes the active region. The control system applies image processing functions to identify the plant in the tiled image and actuates a treatment mechanism to treat the identified plant. The control system causes the array of image sensors to capture the image, identifies the plant, and actuates the treatment mechanism in real time as the farming machine travels through the field.

20 Claims, 18 Drawing Sheets

(56) References Cited

U.S. PATENT DOCUMENTS

| | | | |
|---|---|---|---|
| 10,255,670 B1* | 4/2019 | Wu | H04N 7/183 |
| 10,366,497 B2* | 7/2019 | Zhang | G06T 7/194 |
| 2004/0030492 A1 | 2/2004 | Fox et al. | |
| 2017/0206415 A1 | 7/2017 | Redden | |
| 2017/0223947 A1 | 8/2017 | Gall et al. | |
| 2018/0330166 A1 | 11/2018 | Redden et al. | |
| 2019/0064363 A1 | 2/2019 | Redden et al. | |
| 2019/0150357 A1 | 5/2019 | Wu et al. | |
| 2020/0143212 A1 | 5/2020 | Okazaki | |

OTHER PUBLICATIONS

L. Emmi, M. Gonzalez-de-Soto, G. Pajares, and P. Gonzalez-de-Santos, "Integrating Sensory/Actuation Systems in Agricultural Vehicles," Sensors, vol. 14, No. 3, pp. 4014-4049, Feb. 2014, doi: 10.3390/s140304014 (Year: 2014).*

Gonzalez-de-Santos, P., Ribeiro, A., Fernandez-Quintanilla, C. et al. Fleets of robots for environmentally-safe pest control in agriculture. Precision Agric 18, 574-614 (2017). doi:10.1007/s11119-016-9476-3 (Year: 2017).*

V Partel, S C Kakarla, Y Ampatzidis, Development and evaluation of a low-cost and smart technology for precision weed management utilizing artificial intelligence, Computers and Electronics in Agriculture, vol. 157,ISSN 0168-1699, doi: 10.1016/j.compag.2018.12.048 (Year: 2019).*

Romeo J, Guerrero JM, Montalvo M, Emmi L, Guijarro M, Gonzalez-de-Santos P, Pajares G. Camera sensor arrangement for crop/weed detection accuracy in agronomic images. Sensors (Basel). Apr. 2, 2013;13(4): 4348-66. doi: 10.3390/s130404348. PMID: 23549361; PMCID: PMC3673087 (Year: 2013).*

PCT International Search Report and Written Opinion, PCT Application No. PCT/US2021/046560, Dec. 6, 2021, 12 pages.

* cited by examiner

PLANT IDENTIFICATION USING DYNAMIC CROPPING

CROSS-REFERENCE TO RELATED APPLICATIONS

This application claims benefit of and priority to U.S. Provisional Application No. 63/068,185 filed Aug. 20, 2020, which is hereby incorporated by reference in its entirety.

TECHNICAL FIELD

The described subject matter generally relates to farming technology, in particular to the identification and treatment of plants.

BACKGROUND

Conventional systems for treating crops in a field broadly apply treatment to all plants in the field or to entire zones of plants within the field. These systems have significant drawbacks as they often apply the same treatment to the entire field of plants. For example, in the case of a spray type treatment, treatment fluid is applied throughout the zone or field, resulting in significant waste. When the treatment is a nitrogen-containing fertilizer, excess treatment may be harmful to the environment. Further, in conventional spray treatment systems, crops and weeds are treated collectively. Thus, in the case of fertilizer treatments, weeds may benefit from treatment unless separate effort is expended to remove weeds before treatment.

Currently, it is difficult to apply treatments to individual plants rather than large areas of the field. In an example, farmers manually apply treatments to individual plants, such that the treatments do not affect both weeds and crops. This and similar methods are exceptionally labor-intensive and costly when performed at industrial scale. While some conventional farming systems use imaging technology to identify and treat crops in a field (e.g., satellite imaging, color imaging, thermal imaging, etc.), many of these systems are limited in their ability to properly identify and treat plants at the individual plant level. In particular, these systems can be limited by cost and processing capabilities of image sensors. For example, satellite images have poor resolution for detecting individual plants and color based imaging systems treat all green plants equally whether they are a weed or a crop.

SUMMARY

As a farming machine travels through a field of plants, the farming machine uses a plurality of image sensors to capture images of the field for detecting plants to be treated. The plurality of image sensors are coupled to the farming machine and are tilted downwards at an angle to capture images of the plants in front of the farming machine to be used for identifying plants to treat before the farming machine passes over the plants. To ensure that there are no gaps between images captured by adjacent image sensors, the plurality of image sensors are arranged such that fields of view of adjacent image sensors have an overlapping region. The overlapping fields of view improves accuracy in plant detection by preventing the plurality of image sensors from not being able to capture plants that lie in a region between fields of view, but the overlapping region leads to redundant image data. Additionally, one or more plants in the images captured by the plurality of image sensors may be indistinguishable because the resolution of the images do not allow individual plants located past a threshold distance from the farming machine to be identified. There may also be portions of the images that correspond to portions of the field close to the farming machine, and the farming machine does not have sufficient time for identifying plants in these portions and actuating treatment mechanisms to treat these plants before passing over them. Therefore, there may be irrelevant portions of the images that cannot be used for detecting and locating plants to be treated.

Additionally, the farming machine includes a control system that dynamically identifies an active region corresponding to a portion of the field to be treated by the farming machine. The active region is represented by active pixels in the images captured by the plurality of image sensors, and the active pixels include reliable image data that can be used by the control system to detect plants for treatment. The control system generates a plurality of cropped images by discarding image data from remaining pixels that lie outside of the active region. The farming machine generates a tiled image by stitching the cropped images and identifies plants to treat from the tiled image. The tiled image corresponds to a portion of a field of view of the plurality of image sensors, and the portion of the field is at an angle offset from a direction of travel of the farming machine. By discarding irrelevant image data, the control system minimizes image data to which image processing operations are performed, which reduces the computational power required for identifying plants in the field and improves image processing speed. Responsive to detecting the plants in the active region from the tiled image, the control system actuates a plurality of treatment mechanisms to treat the plants. As the farming machine moves through the field, the farming machine continuously captures images of a portion of the field that is in front of the farming machine and identifies an active region including plants to be treated. Because the farming machine moves and captures new images, the active region also moves, and the farming machine can treat different portions of the field over time.

In other words, the farming machine is capable of performing method of treating a plant in the field using tiled images. To do so, the farming machines accesses a plurality of images of the field. The plurality of images are accessed from a plurality of image sensors tilted towards the field at a tilt angle. Each of the plurality of images includes both a plurality of active pixels representing an active region for treating the plant in the field, and a plurality of remaining pixels. As the farming machine travels towards the plant in the field, it generates a tiled image from the plurality of images. To generate the tiled image, the farming machine (1) identifies the active region in the plurality of images, (2) generates a plurality of cropped images, each of which includes active pixels corresponding to the identified active region, and (3) generates the tiled image including the active region by stitching together the active pixels in the plurality of cropped images. The farming machine identifies the plant in the tiled image and actuates a plurality of treatment mechanisms to treat the plant as the farming machine travels past the plant in the field.

The active region can be defined in a variety of manners. For example, the active region may comprise a near boundary representing a location in the field where the plant can be identified by the controller before the farming machine travels past the plant in the field, and a far boundary representing a location in the field where an identification accuracy of the plant is below a threshold accuracy level. The far boundary may be determined based on an occlusion area associated with an object within the active region. The occlusion area may correspond to an area behind the object that is not visible to the plurality of image sensors. In another example, the active region may comprise a near boundary representing a location in the field at a lower threshold distance from the plurality of treatment mechanisms, and a far boundary representing a location in the field at an upper threshold distance from the plurality of treatment mechanisms. Other examples are also possible. In whatever case, identifying the active region may comprise calculating the active region for the farming machine as it travels through the field based on a configuration of the farming machine.

Moreover, generating tiled images may occur in a variety of manners. For example, the farming machine generating a tiled image may comprise identifying an overlapping region in a first cropped image and a second cropped image of the plurality of cropped images. In this case, the overlapping region comprises one or more active pixels in each of the first cropped image and second cropped image representing one or more same objects. In some examples, the identified plant is in the overlapping region. The farming machine applies one or more image processing functions to the one or more active pixels in the overlapping region such that the one or more same objects are accurately represented in the tiled image. Depending on the configuration of the farming machine, applying the one or more image processing functions to the one or more active pixels modifies one or more characteristics of the first cropped image or the second cropped image by performing one or more of the following operations: cropping, keystoning, scaling, shifting, stabilizing, debayering, white balancing, resizing, controlling exposure, correcting color, adjusting reflectance, or normalizing values.

Similarly, generating cropped images may occur in a variety of manners. For example, generating cropped images may comprise applying one or more image processing operations to the one or more of the plurality of images to modify one or more characteristics of the one or more images. Depending on the configuration of the farming machine, the image processing operations may be selected based on the tilt angle, a height of the treatment mechanisms above the field, a distance between the treatment mechanisms and the image sensors, a speed of the farming machine, a processing time of the one or more images, a treatment time representing an expected amount of time between actuating a treatment mechanism and delivery of a treatment to the plant, or a height of the plant.

The active region may also have a relationship to a targeted active region. Therefore, the farming machine may also compare the identified active region in the plurality of images to a predetermined target active region of the farming machine. Responsive to identifying that the identified active region that the plurality of treatment mechanisms is configured to treat is not the same as the predetermined target active region, the farming machine may modify a configuration of the farming machine to align the identified active region with the target active region. The farming machine may continuously modify the configuration of the farming machine to align the identified active region with the predetermined target active region. A targeted active region may be determined based on a portion of the field that is a target size and a target shape, a target near boundary, a target far boundary, a target number of overlap regions, a target size of overlap regions, a target distance from the overlap regions to the plurality of treatment mechanisms, and a height of the plant.

The tilt angle may affect identification and treatments of plants. The tilt angle may be any of an angle between a front surface of the plurality of image sensors and the field, a virtual angle in an image of the plurality of images, the virtual angle representative of a quantification of a projection of a field of view of the plurality of image sensors on a sensor array, and an angle between the sensor array and the field. Images may be received from one or more different tilt angles, and the images received from those tilt angles may be interleaved. Therefore, a first set of images captured by a first image sensor of the plurality of image sensors may have a first tilt angle of less than 35 degrees relative to a vector orthogonal to a direction of travel of the farming machine, and a second set of images captured by a second image sensor of the plurality of image sensors may have a second tilt angle greater or equal to 35 degrees relative to the vector. The controller may generate the tiled image using the first set of images and identifies the plant from the tiled image. The tiled image may be interleaved from images captured at different tilt angles.

Additionally, the image sensors may affect identification and treatments of plants. For example, one or more of the image sensors may be rolling shutter image sensors. Each rolling shutter image sensor captures a plurality of image portions of an image over a period of time. In this case the controller generates the tiled image from a first image portion of the plurality of image portions and identifies the plant in the tiled image. Moreover, the controller may generate a second tiled image from a second image portion of the plurality of image portions and identify a second plant to treat in the second tiled image. Here, the first image portion corresponds to a first portion of the field at a first distance from the farming machine and the second image portion corresponds to a second portion of the field at a second distance from the farming machine less than the first distance. The controller may generate the second tiled image faster than the first tiled image.

Figure 1A:
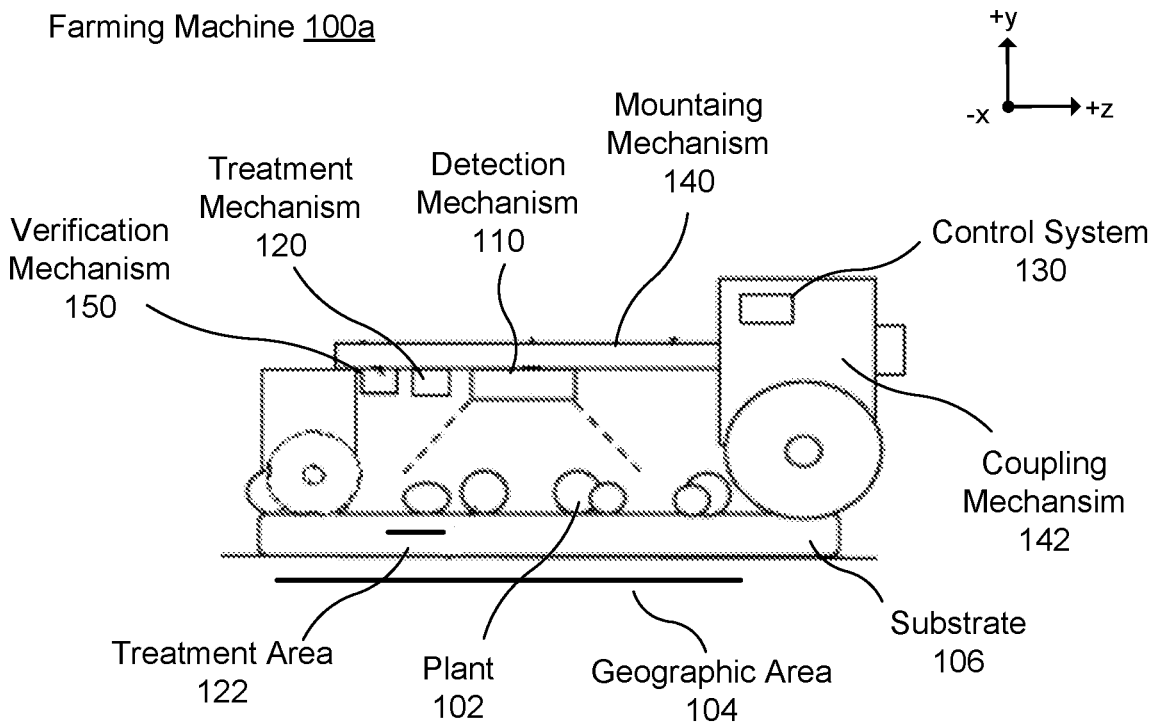
FIG. 1A illustrates a side view of a farming machine, in accordance with a first example embodiment.

The figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality

DETAILED DESCRIPTION

I. Introduction

A farming machine includes an automated or semi-automated system for identifying and treating plants in a field. The farming machine employs an image acquisition system to detect plants for treatment as the farming machine travels through the field. The image acquisition system includes a plurality of image sensors (e.g., cameras) physically coupled to the farming machine to capture images of one or more plants. A control system identifies plants in the images and actuates treatment mechanisms coupled to the farming machine to treat the identified plants based on the images. As such, the farming machine is configured to target and treat plants individually, thus reducing waste and preventing unwanted plant growth resulting from treatments that are applied liberally across a field. Using an automated system also reduces manual labor and other costs associated with treating plants individually, improving farming efficiency.

Automatically treating plants with farming machines including a control system and image acquisition system is a complex process. In particular, plant identification algorithms are computationally expensive and, oftentimes, sacrifice plant identification speed in favor of plant treatment accuracy and vice versa. This speed/accuracy interplay affects the efficiency of farming operations. For example, a first farming machine may move quickly through the field treating plants with less accuracy, while a second farming machine may move more slowly through the field treating plants with more accuracy. However, in both examples, the farming machine is performing at less than optimal efficiencies. Ideally, a farming machine would move through the field quickly while simultaneously identifying and treating plants with a high degree of accuracy.

A factor in determining the speed and/or accuracy of a farming machine in treating plants is the orientation of the image acquisition system. To date, farming machines generally employ image acquisitions in one of two orientations (i) an image sensor directed downwards towards the field, or (ii) an image sensor directed forwards in the direction of travel. A downward-facing image sensor provides higher quality images to identify plants, leading to higher identification and treatment accuracy. However, the downward-facing sensor also yields a lesser amount of time to process images, forcing the farming machine to move more slowly through the field to maintain accuracy. Conversely, a forward-facing image sensor yields a greater amount of time to process images allowing the farming machine to move more quickly through the field. However, the forward-facing image sensor also provides lower quality images for plant identification which decreases identification and treatment accuracy.

A farming machine employing an image sensor tilted downwards towards a plant (or field) allows for a control system to capture an image, identify a plant, and apply a treatment to the identified plant within a short time period without sacrificing accuracy and precision. Key to this improvement is that a tiled image sensor has a field of view optimized for farming efficiency. In particular, as described in greater detail below, the field of view provides higher quality images for plant identification than a forward-facing image sensor, while, simultaneously, providing a greater amount of time to process the image than a downward-facing image sensor.

The farming machine is configured to process images obtained by a tiled image sensor to accurately identify and treat plants in a field. Herein, processing the image (more generally "image processing") includes (i) applying any number of functions to the image to modify the image ("modification functions"), and (ii) employing a plant identification model to identify plants in an image ("plant identification"). A tiled image sensor may include various properties ("sensor properties") that affect image processing. Sensor properties may be, for example, described in one of two groups: (i) physical properties, and (ii) changeable properties (i.e., "settings"). Some physical properties may include, for example, lens size, lens type, lens tilt, processing capabilities, etc. Some changeable properties may include, for example, aperture, lens tilt, zoom, ISO speed, exposure, flash, lens filter, flash, etc.

As described above, sensor properties may affect image processing. In an example, sensor properties may affect characteristics of an image obtained by the image sensor ("image characteristics"). Some image characteristics may include, for example, image pixilation, image resolution, image size, image shape, etc. A farming machine may employ different modification functions based on the image characteristics. Some modification functions include, for example, cropping, value normalization, image aggregation, filtering, etc. Image modification using modification functions is described in more detail below. Further, a farming machine may employ a plant identification model affected by image characteristics. To illustrate, the image characteristics may affect the accuracy, precision, and/or speed of plant identification by a plant identification model.

Additionally, the field of view of a tiled image sensor may be affected by sensor properties. The field of view, herein, is the angular extent of an area captured by an image sensor. Thus, the area captured by the image sensor may be affected by the sensor properties. For example, the field of view may be based on the size the image sensor (e.g., the size of the lens) and the focal length. The field of view may also depend on the orientation of the image sensor. For example, an image sensor in a downwards orientation may generate an image representing an approximately rectangular area, while a tiled image sensor may generate an image representing an approximately trapezoidal area. More generally, image processing is a complex process that contingent on the interdependency all of the above factors (e.g., sensor properties affect image characteristics and field of view, image characteristics and field of view affect image modification, image modification affects plant identification, etc.).

A farming machine with a tiled image sensor includes a control system configured to identify and treat plants using images generated by the tiled image sensor despite the complexity of the problem. The control system employs the tiled image sensor to capture an image of a plant in the optimized field of view as the farming machine travels through the field. In some embodiments, the tiled image sensor is one of an array of tiled image sensors, and the control system generates an aggregate tiled image of one or more plants based on images captured by the array, allowing the control system to apply a targeted treatment to multiple plants as the farming machine travels through the field. The control system applies one or more modification functions to the image(s) to modify the image for the plant identification process. For example, the control system may apply one or more modification functions to minimize inconsistencies in captured images caused by vibrations of the mounting mechanism as the farming machine moves through the field. The control system actuates a treatment mechanism to treat identified plants in an image. The treatment mechanism applies the treatment to an individual plant as the farming machine travels over the plant.

To generate the tiled image based on the images captured by the array of tiled image sensors, the control system dynamically identifies an active region in the plurality of images. The active region corresponds to a region of the field that lies ahead of the farming machine in its direction of travel including one or more plants to be treated by the treatment mechanism after the control system detects presence and identifies locations of the one or more plants based on the images. After receiving the images captured by the array of tiled image sensors, the control system determines boundaries of the active region that corresponds to locations within the field where plants can be identified by the control system for treatment based on geometric and/or operating parameters of the farming machine. After identifying the active region in the images, the control system crops the images by such that the cropped images include active pixels corresponding to the identified active region. Because the array of the tiled image sensors are disposed such that adjacent tiled image sensors have an overlap in fields of view, the control system identifies overlapping pixels in the cropped images and stitches the cropped images using the overlapping pixels to generate a tiled image representing the active region. The tiled image is applied with image processing functions to identify the one or more plants to be treated. Because the tiled image includes a portion less than all of image data included in the plurality of raw images captured by the array of tiled image sensors, using the tiled image for detecting the one or more plants improves image processing efficiency by reducing time and computational resources required for the image processing.

II. Plant Treatment System

Figure 1B:
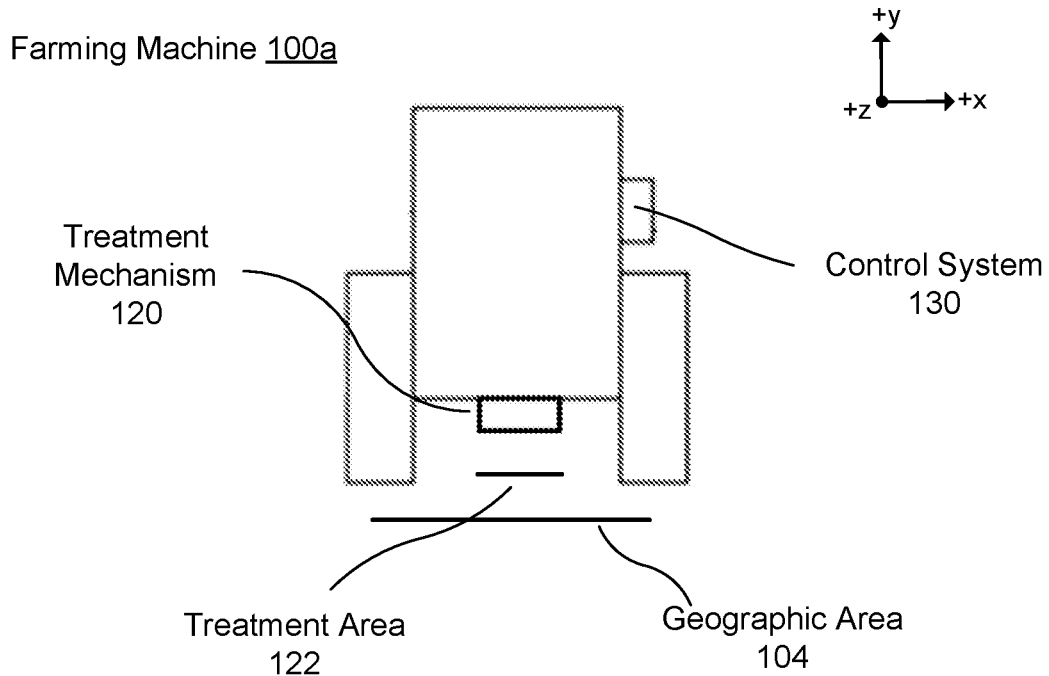
FIG. 1B illustrates a front view of a farming machine, in accordance with the first example embodiment.
Figure 1C:
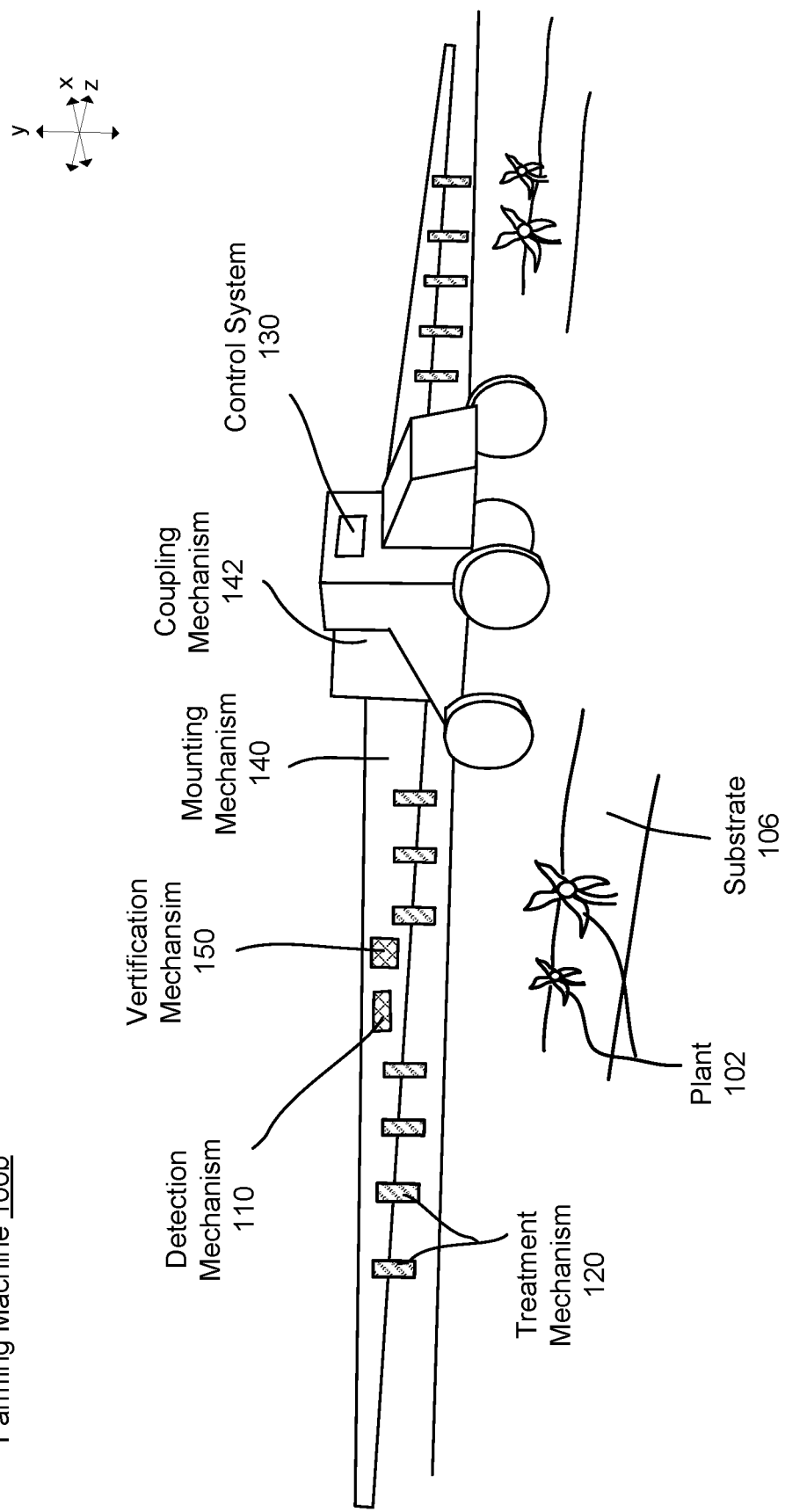
FIG. 1C illustrates an isometric view of a farming machine, in accordance with a second example embodiment.
Figure 1D:
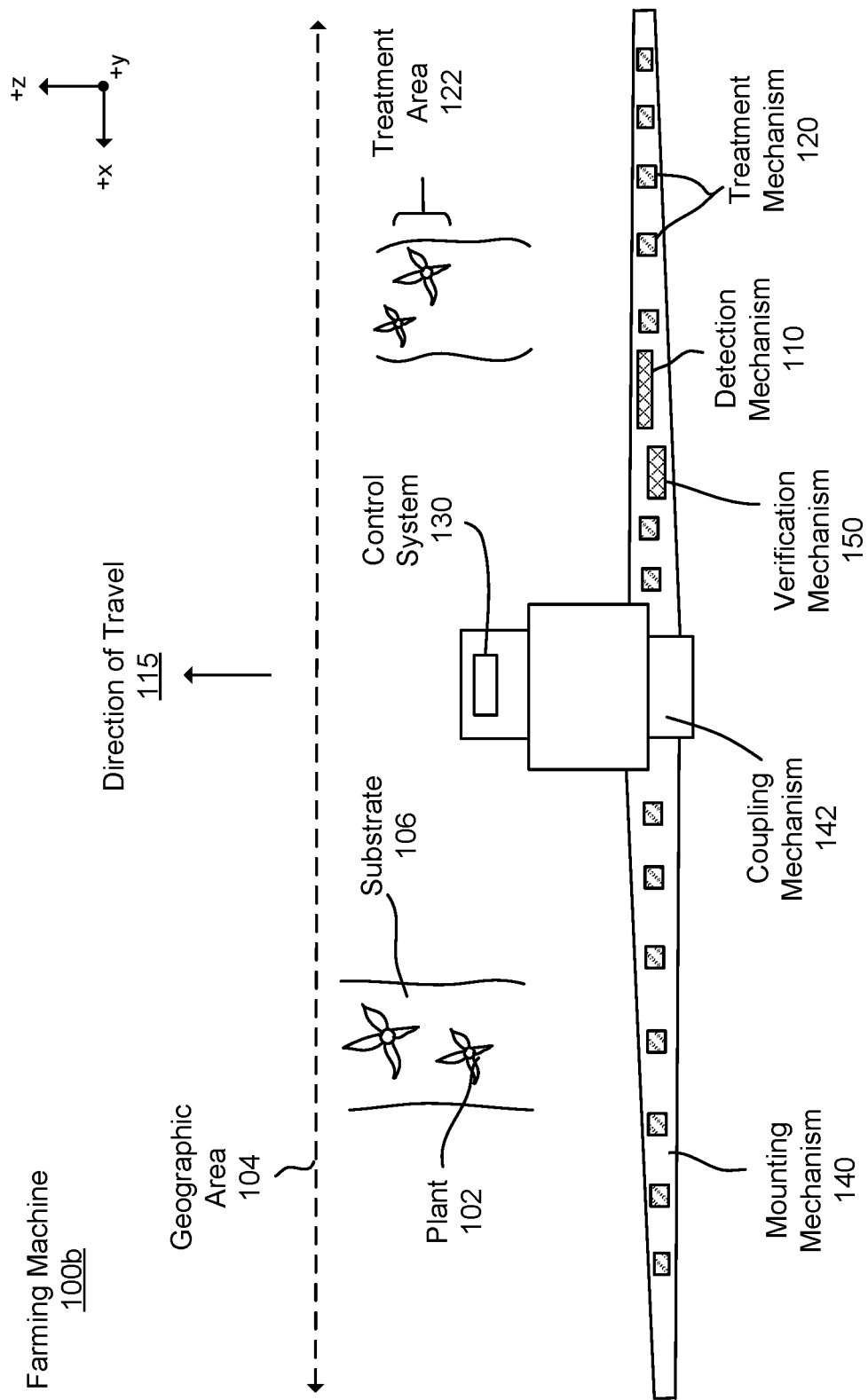
FIG. 1D illustrates a top view of a farming machine, in accordance with the second embodiment.
Figure 1E:
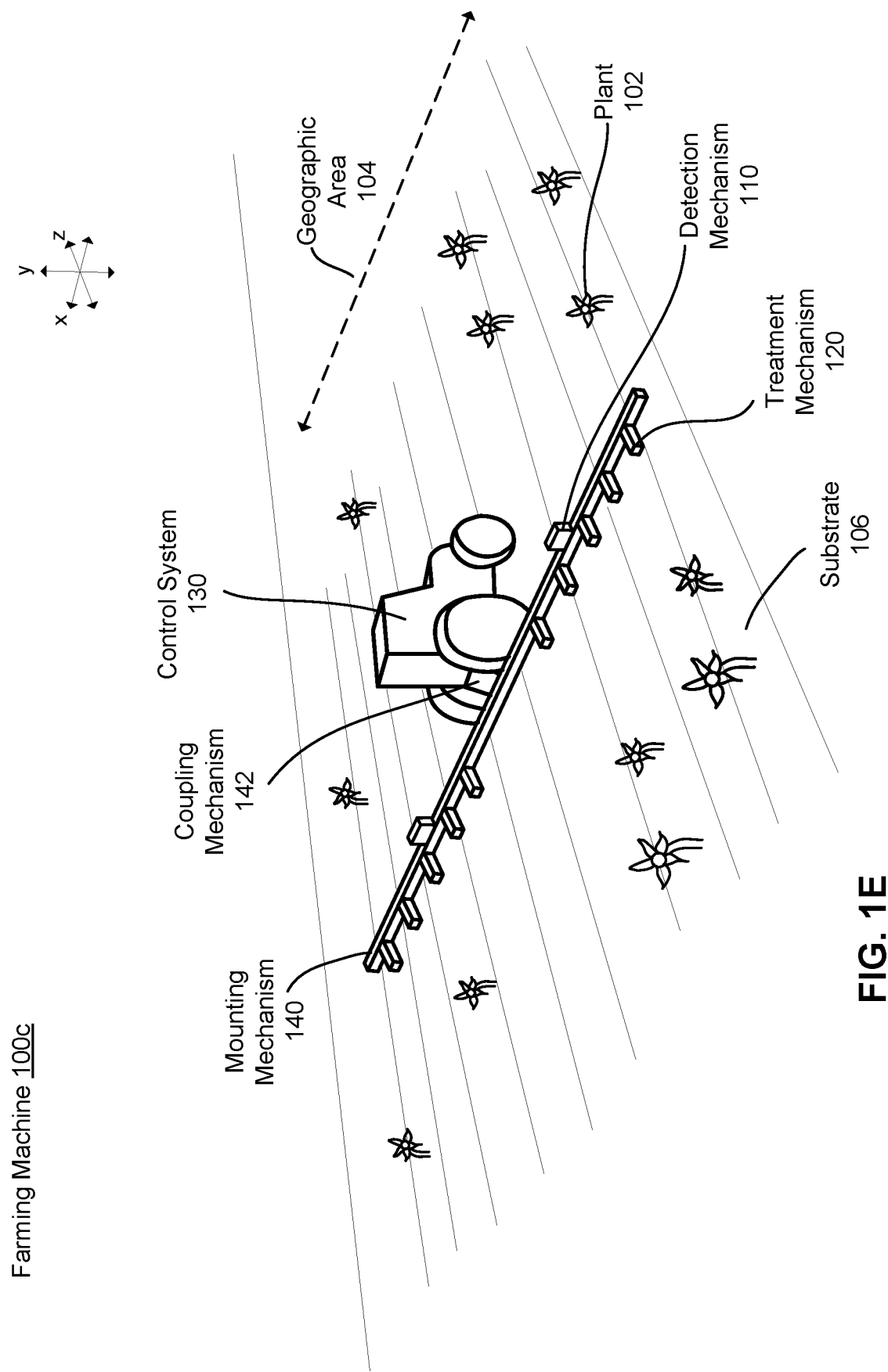
FIG. 1E illustrates an isometric view of a farming machine, in accordance with a third example embodiment.

A farming machine that identifies and treats plants may have a variety of configurations, some of which are described in greater detail below. For example, FIG. 1A is a side view of a first embodiment of a farming machine and FIG. 1B is a front view of the first embodiment of the farming machine of FIG. 1A. FIG. 1C is an isometric view of a second embodiment of a farming machine and FIG. 1D is a top view of the second embodiment of the farming machine of FIG. 1C. FIG. 1E is a third embodiment of a farming machine, in accordance with one embodiment. The farming machine 100, illustrated in FIGS. 1A-1E, includes a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g. same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

Figure 2A:
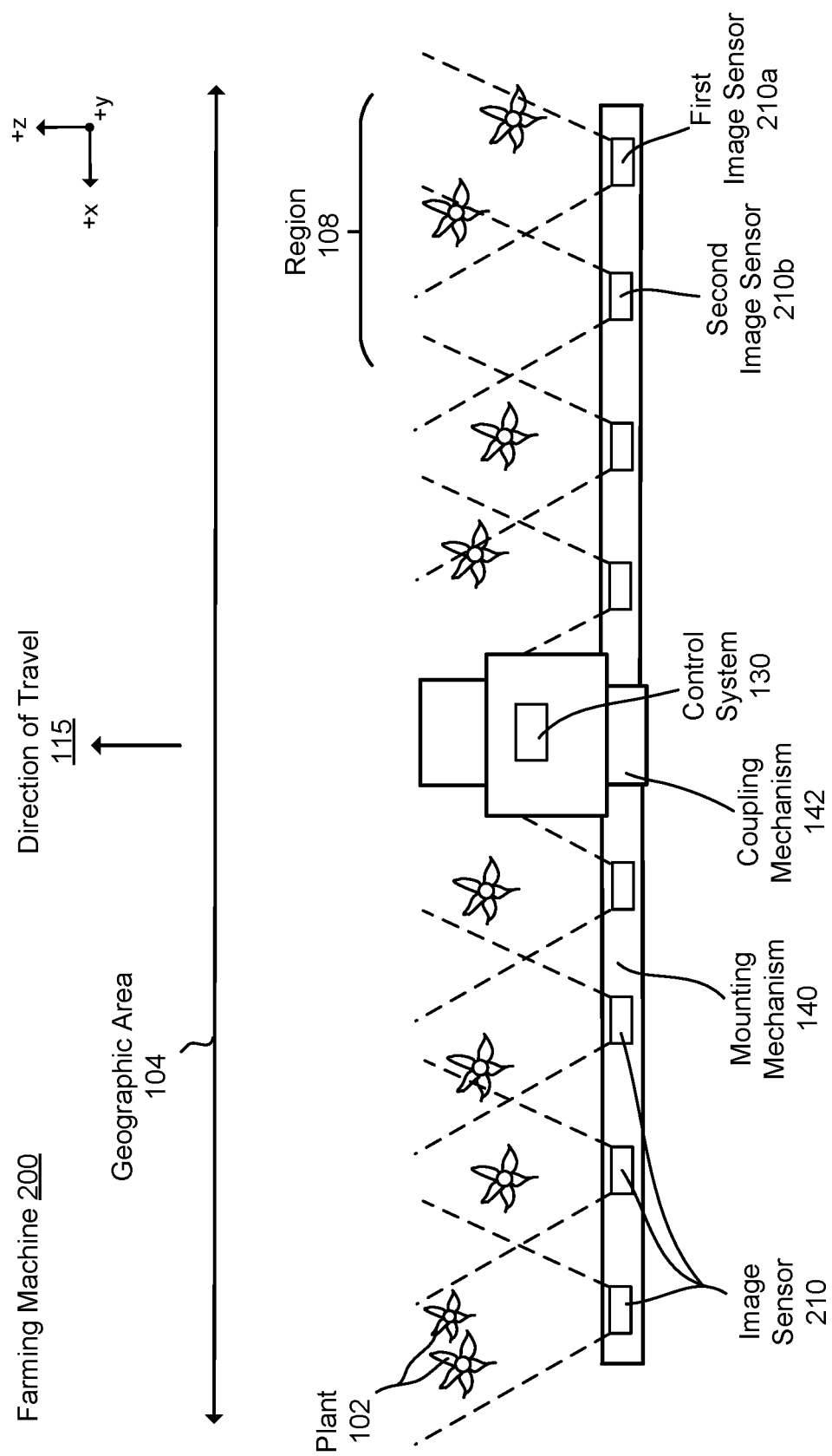
FIG. 2A illustrates a top view of a farming machine with an array of image sensors, in accordance with an example embodiment.
Figure 2B:
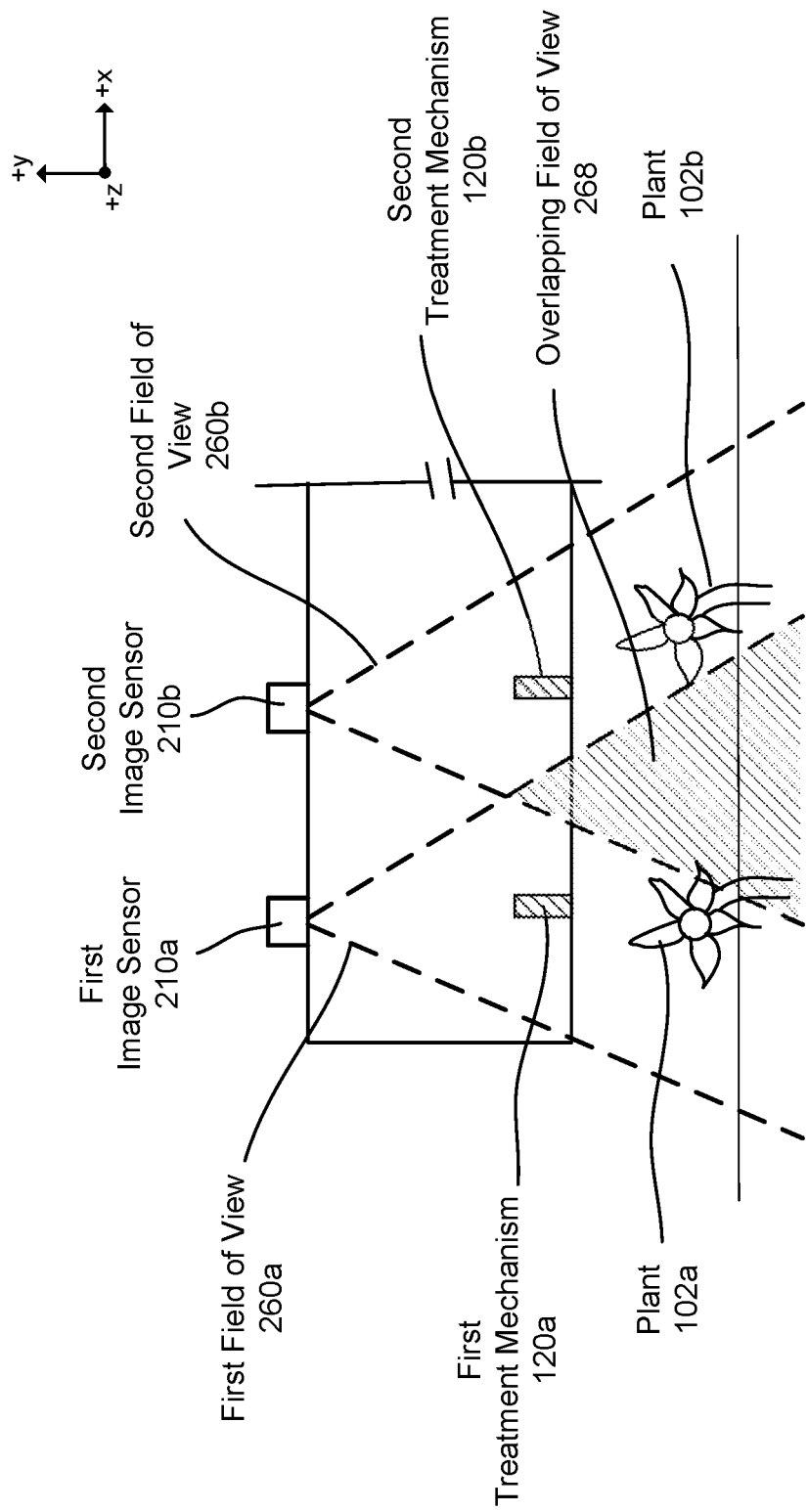
FIG. 2B illustrates a front view of a portion of a farming machine with an array of image sensors, in accordance with an example embodiment.
Figure 2C:
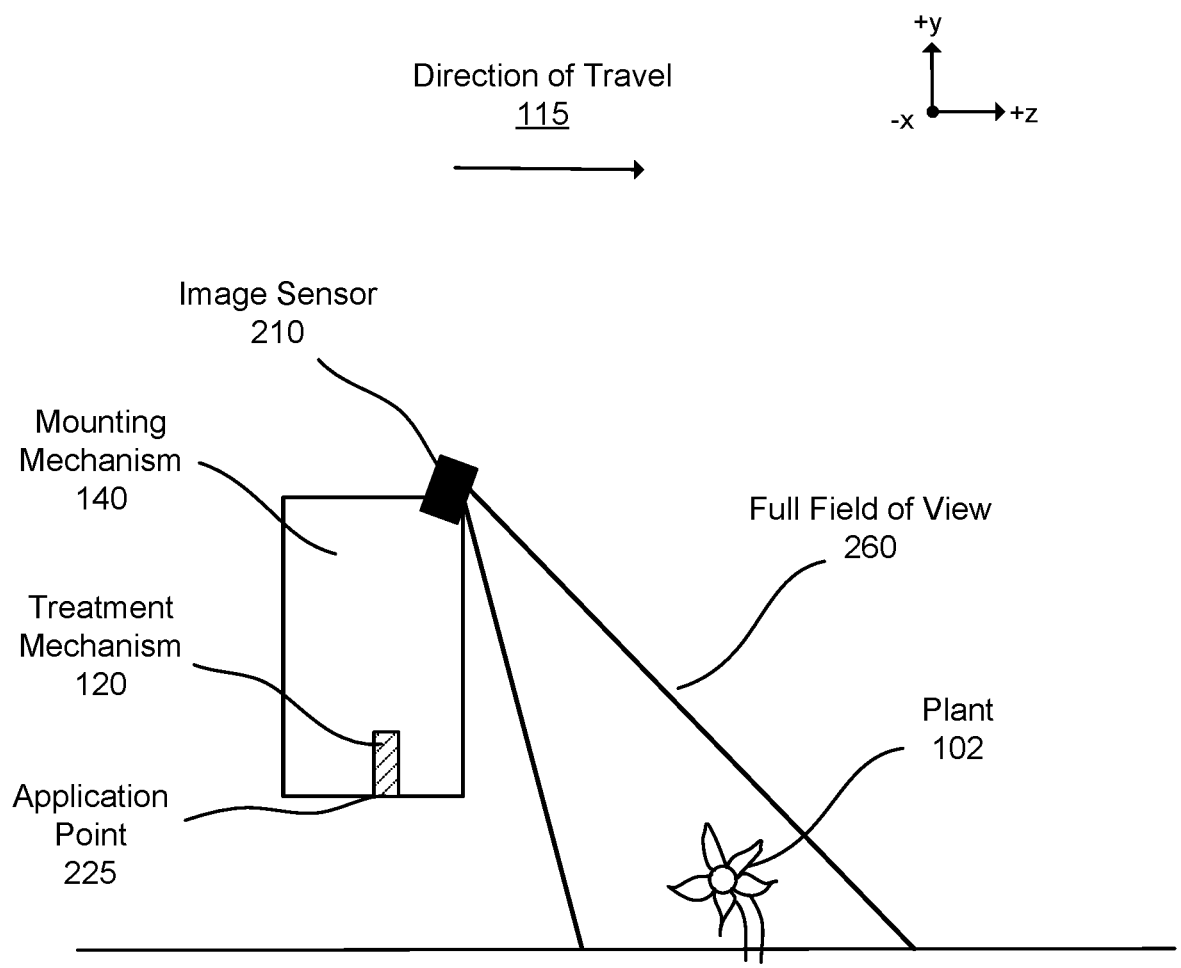
FIG. 2C illustrates a side view of an image sensor coupled to a mounting mechanism, in accordance with an example embodiment.

The detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, hyperspectral imaging system, LIDAR system (light detection and ranging system), dynamometer, IR camera, thermal camera, humidity sensor, light sensor, temperature sensor, or any other suitable sensor. In the embodiment of FIGS. 2A-2C and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the farming machine 100 moves traverses through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, such as in FIGS. 1A-1B, the farming machine 100a includes a single treatment mechanism, wherein the treatment mechanism 120 is actuated or the farming machine 100a moved to align the treatment mechanism 120 treatment area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation shown, such as in FIGS. 1C-1E, the farming machine (i.e., 100b, 100c) includes an array of treatment mechanisms 120, wherein the treatment mechanisms 120 are actuated or the farming machine (i.e., 100b, 100c) is moved to align the treatment mechanism 120 treatment area 122 with the targeted plant 102 or plant segment.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 includes a mounting mechanism 140 that functions to provide a mounting point for the system components. In one example, as shown in FIG. 1A-1B, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In the embodiment of FIGS. 1C-1E, the mounting mechanism 140 extends outward from a body of the farming machine (i.e., 100b, 100c) in the positive and negative x-direction (in the illustrated orientation of FIGS. 1A-1E) such that the mounting mechanism 140 is approximately perpendicular to the direction of travel 115. The mounting mechanism 140 in FIGS. 1C-1E includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In the first embodiment, each wheel in each set is arranged along an opposing side of the mounting mechanism 140 such that the rotational axes of the wheels are approximately perpendicular to the mounting mechanism 140. In the second and third embodiments of the farming machine, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some configurations, the farming machine 100 additionally include a verification mechanism 150 that functions to record a measurement of the ambient environment of the farming machine 100. The farming machine may be use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

III. System Configuration

FIG. 2A illustrates a top view of a farming machine traveling through a field, in accordance with one or more embodiments. The farming machine 200 is substantially similar to farming machine 100. The farming machine 200 includes a control system 130, a mounting mechanism 140, a coupling mechanism 142, an array of image sensors 210, and an array of treatment mechanisms 120 (not shown in FIG. 2A). In other embodiments, the farming machine 200 can include fewer or greater elements than described below.

The mounting mechanism 140 is configured to retain other elements of the farming machine 200. Additionally, the mounting mechanism 140 includes two components extending from the coupling mechanism 142 such that the mounting mechanism 140 is approximately perpendicular to the direction of travel 115. The farming machine 200 also includes an array of image sensors 210 attached laterally along the mounting mechanism 140. As illustrated, the image sensors 210 are spaced at a regular interval along the mounting mechanism 140, but could also be spaced at varying intervals along the mounting mechanism 140. The image sensors 210 are configured to capture images of plants 102 in the geographic area 104 as the farming machine 200 moves in the direction of travel 115. Although not shown in FIG. 2A, the farming machine 200 also includes an array of treatment mechanisms 120 configured to treat plants 102 in the geographic area 104. The treatment mechanisms 120 are attached laterally along the mounting mechanism 140. In one embodiment, a treatment mechanism 120 is attached substantially below each image sensor 210 (i.e., in the −y direction relative to the illustrated image sensor 210) in the array of image sensors 210, described in greater detail below.

The control system 130 captures images of plants 102 using image sensors 210 as the farming machine 200 travels through the field. The image sensors 210 can capture images at specified time intervals, at one or more specified times during operation of the farming machine 200, randomly, or according to other parameters set by the control system 130.

In some embodiments, the image sensors 210 function collectively. For example, the control system 130 configures each image sensor in the array of image sensors 210 to capture images simultaneously (e.g., every 15 seconds, every 0.5 seconds, etc.). In other embodiments, each of the image sensors 210 in the array of image sensors 210 functions independently. For example, a first image sensor 210a captures an image at a first time (e.g., at 12:00) and a second image sensor 210b captures an image at a subsequent time (e.g., at 12:01). Alternatively, some of the image sensors 210 operate collectively, while others operate independently. For example, the control system 130 selects a group including the first image sensor 210a to operate collectively, while the second image sensor 210b operates independently. In alternative embodiments, the control system 130 configures the image sensors 210 to capture images according to any suitable parameters.

The image sensors 210 are tilted downwards, defined in greater detail below in relation to FIG. 3, and towards the direction of travel 115. The field of view of each image sensor 210 extends in the positive z-direction and negative y-direction, shown by the dashed lines, such that the image sensors 210 capture images of plants 102 ahead of the farming machine 200. In alternative embodiments, the image sensors 210 are directed downwards and behind the farming machine 200, away from the direction of travel 115 (e.g., image sensors 210 may operate as a verification mechanism 150).

In the embodiment of FIG. 2A, the field of view of each image sensor 210 overlaps with the field of view of one or more proximal image sensors 210 in the array. For example, a field of view of the first image sensor 210a overlaps with a field of view of the second image sensor 210b. As such, the control system 130 can generate an aggregate image of a portion of the geographic area 104 based on the field of view of each individual image sensor 210. An aggregate image is in an image including at least a portion of a field of view of a first image sensor and at least a portion of a field of view of a second image sensor. For example, in the embodiment of FIG. 2A, the control system 130 can generate an aggregate image of a region 108 based on a field of view the first image sensor 210a and the second image sensor 210b. Based on the aggregate image, the control system 130 can identify and apply a targeted treatment any of the plants 102 in the region 108 as the farming machine 200 travels through the field. In some embodiments, the control system 130 can generate one or more aggregate images based on the field of view of all of the image sensors 210 in the array, so that the farming machine 200 can identify and treat the plants 102 across the geographic area 104.

FIG. 2B is a front view of a portion of the mounting mechanism shown in FIG. 2A, according to an example embodiment. In FIG. 2B, the first image sensor 210a and the second image sensor 210b are coupled to a superior surface of the mounting mechanism 140. In other embodiments, the image sensors 210 are coupled to a different surface of the mounting mechanism 140 and/or the farming machine 200. Regardless of the attachment surface of an image sensor 210, image sensors 210a and 210b are tilted downwards in order to capture an image of a plant.

As described above, the first image sensor 210a has a first field of view 260a that overlaps with a second field of view 260b of the second image sensor 210b. The field of view of each image sensor 210 determines the area that the image sensor 210 captures in an image. In the embodiment of FIG. 2B, the image sensors 210a and 210b capture images of plants (e.g., plant 102a, plant 102b) in their respective fields of view. An overlapping field of view 268 illustrates the area seen by both the first image sensor 210a and the second image sensor 210b.

In some embodiments, the control system 130 can apply one or more modification functions to images taken by the first image sensor 210a and/or the second image sensor 210b. The modification functions may be used to modify the image such that the field of view represented in the image is modified. For example, the modification function may reduce the size of the image such that the field of view represented in the image is also reduced. In another example, the modification functions may combine fields of view from one or more images. Some example modification functions include cropping, value normalization, white balancing, etc., described in greater detail below.

The portion of the farming machine 200 shown in FIG. 2B includes a first treatment mechanism 120a and a second treatment mechanism 120b. The treatment mechanisms 120 are coupled to the mounting mechanism 140 and configured to treat one or more plants 102. The treatment mechanisms 120a and 120b can be the same type of treatment mechanisms or different treatment mechanisms, as described above in relation to FIGS. 1A-1E. In the embodiment shown, the treatment mechanisms 120a and 120b are directed downwards such that each treatment mechanism 120 applies a treatment to a plant substantially below the treatment mechanism 120. In alternative embodiments, the treatment mechanisms 120 can be angled in a direction towards one or more plants (e.g., to treat a plant ahead of or behind the mounting mechanism 140). The treatment mechanisms 120 can be coupled to any surface of the mounting mechanism 140 or they can be retained in a receptacle of the mounting mechanism 140, described below in relation to FIG. 2C.

The control system 130 uses a plant identification model to identify one or more plants in the images captured by the first image sensor 210a and the second image sensor 210b. The control system 130 actuates a corresponding treatment mechanism (e.g., 120a, 120b) in response to an identified plant. In the embodiment of FIG. 2B, the first image sensor 210a corresponds to the first treatment mechanism 120a and the second image sensor 210b corresponds to the second treatment mechanism 120b. As such, the first treatment mechanism 120a treats a plant 102a identified in an image captured by the first image sensor 210a and the second treatment mechanism 120b treats a plant 102b identified in an image captured by the second image sensor 210b. Either the first treatment mechanism 120a or the second treatment mechanism 120b can treat a plant in the overlapping field of view 268. In some embodiments, one image sensor (e.g., 210a or 210b) may correspond to multiple treatment mechanisms (e.g., 210a and 210b). In other embodiments, a single treatment mechanism 120 is mounted to the mounting mechanism 140 and the treatment mechanism 120 is configured to move along the mounting mechanism 140 to treat plants (e.g., 102a, 102b) identified in an image captured by an image sensor 210.

FIG. 2C illustrates a cross sectional view of the mounting mechanism, according to an example embodiment. The mounting mechanism 140 includes an image sensor 210 (e.g., image sensor 210a in FIG. 2B) coupled to a superior surface of the mounting mechanism 140. The image sensor 210 is titled downward such that the image sensor 210 captures an image of a plant 102 ahead of the mounting mechanism 140, shown by a full field of view 260 of the image sensor 210.

In the embodiment of FIG. 2C, the treatment mechanism 120 is recessed within the mounting mechanism 140. As such, the mounting mechanism 140 includes one or more receptacles for retaining a treatment mechanism 120 in position along the mounting mechanism 140. Alternatively, a treatment mechanism 120 can be integral to the mounting mechanism 140 or attached to an external surface of the mounting mechanism 140. In some embodiments, the treatment mechanism 120 is removable from the mounting mechanism 140 so that it can be easily repaired or replaced. Additionally, in FIG. 2C, the treatment mechanism 120 is coupled to the mounting mechanism 140 such that a region of the treatment mechanism 120 configured to apply treatment (e.g., an application point 225) is approximately flush with an inferior surface of the mounting mechanism 140. The application point 225 is the point from which the treatment is applied (e.g., a nozzle tip for a spray treatment). In alternative embodiments, the application point 225 is protruding from or recessed within a surface of the mounting mechanism 120.

IV. Tilt Geometry

Figure 3:
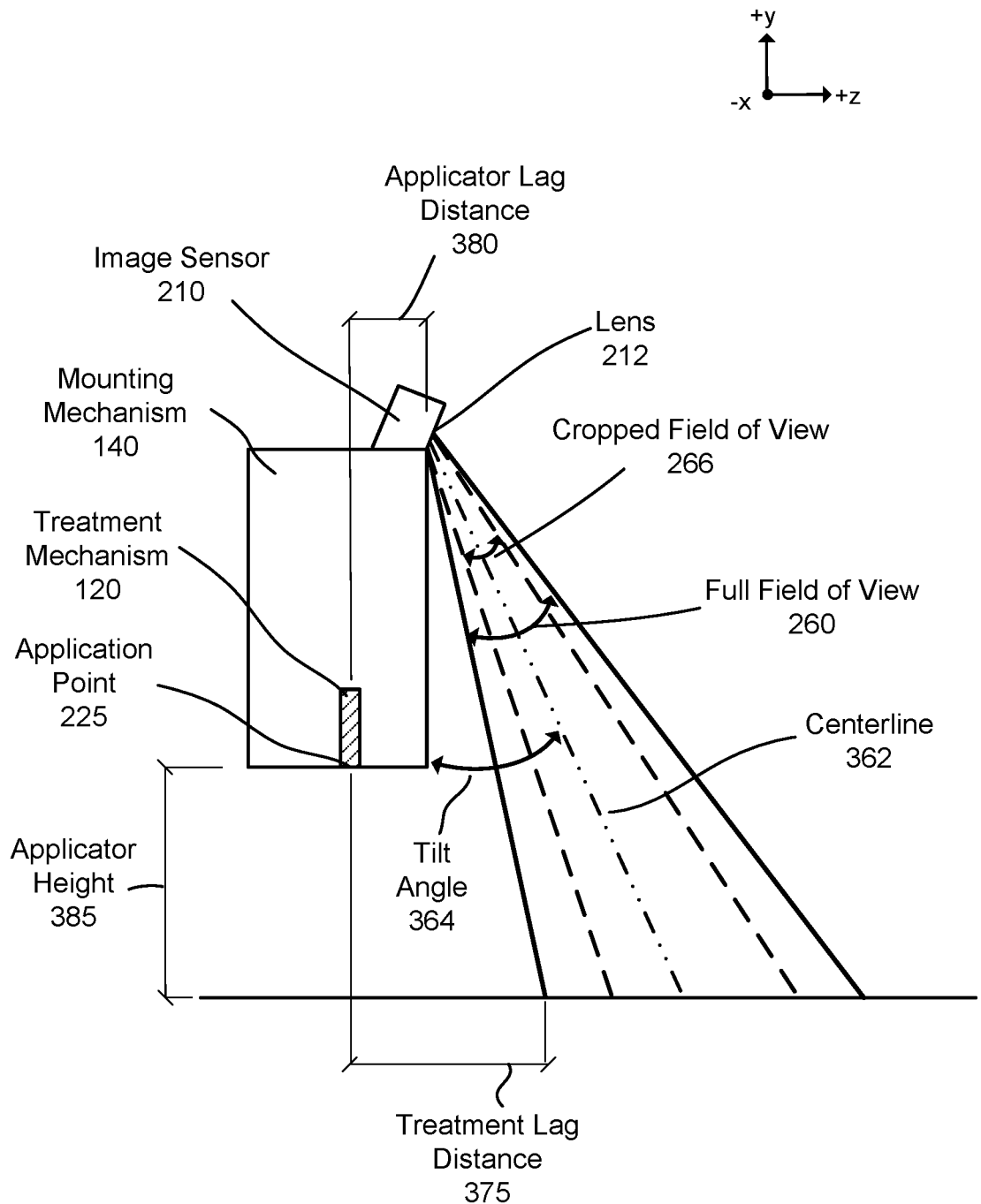
FIG. 3 is a cross sectional view of an image sensor coupled to a mounting mechanism, in accordance with an example embodiment.

FIG. 3 is a side view of an image sensor coupled to a mounting mechanism, according to one or more embodiments. FIG. 3 illustrates geometric parameters related to the image sensor 210, the mounting mechanism 140, and the treatment mechanism 120. The geometric parameters include a tilt angle 364 of the image sensor 210, an applicator height 385, an applicator lag distance 380, a full field of view 260, a cropped field of view 266, and a treatment lag distance 375. In other embodiments, the system can include fewer or additional geometric parameters. The components may also be arranged in a different configuration than described below.

The image sensor 210 is tilted a tilt angle 364 to capture an image of a plant. The tilt angle 364 is the angle between a line of sight (i.e., a centerline 362) of the image sensor 210 and the negative y-axis. The image sensor 210 itself may be tilted, or one or more of the optics (e.g., a lens, a photosensor, focusing optics, etc.) can be tilted. For example, the image sensor 210 can face forward (e.g., in the positive z-direction) and include a detachable lens that directs the centerline 362 downwards (e.g., in the negative y-direction). In another example, the image sensor 210 can face forwards and the photosensor internal to the image sensor 210 may be tilted at a tilt angle. The tilted angle 364 may be an angle between a front surface of the image sensor 210 and the field, a virtual angle in an image captured by the image sensor 210 representative of a quantification of a projection of a field of view of the image sensor 210 on a sensor array, and an angle between the sensor array and the field.

Generally, the tilt angle for the image sensor 210 is downwards. Downwards may be represented, for example, by a value of a relative angle between the negative y-axis and a vector orthogonal to a lens 212 of the image sensor 210. To provide context, downwards may be any value of the relative angle less than 90°. In other examples, downwards may be a value of the relative angle less than a threshold angle (e.g., 30°, 40°, 50°, 60°, etc.). In various contexts, downwards may have other similar definitions. For example, downwards may be represented as a value of the relative angle between positive z-axis and a vector orthogonal to the photosensor, a value of the relative angle between the positive x-axis and the centerline of the image sensor, etc.

As shown in FIG. 3, the tilt angle 364 of the image sensor 210 is downwards and forwards. In one embodiment, the tilt angle 364 is less than 35 degrees. The full field of view 260 of the image sensor 210 depends on the tilt angle 364 and properties of the image sensor 210 (e.g., focus, zoom, lens size, etc.). The control system 130 may adjust the tilt angle 364 based on properties of the image sensor 210 and/or other geometric parameters of the system. For example, if a farming machine is travelling slowly, the control system 130 may increase the tilt angle 364 and/or decrease the applicator height 385.

In the embodiment of FIG. 3, the treatment mechanism 120 is located behind the image sensor 210 such that the treatment mechanism 120 traverses over a plant after the image sensor 210 as the farming machine 200 moves in the direction of travel 115 (i.e., the treatment mechanism 120 is located behind the image sensor 210 along the z-axis). Thus, the farming machine 200 has an applicator lag distance 380 between the image sensor 210 and the treatment mechanism 120 along the z-axis between the lens 212 of the image sensor 210 and the treatment mechanism 120. The applicator lag distance 380 allows the control system 130 to capture and process an image of a plant ahead of the treatment mechanism 120 before the treatment mechanism 120 passes over the plant. In alternative embodiments, the treatment mechanism 120 is located approximately in line with the image sensor 210 along an axis parallel to the y-axis. In other embodiments, the treatment mechanism 120 is configured to move along the mounting mechanism 140 in any direction (i.e., x, y, and z) in order to treat an identified plant. In other embodiments, the treatment mechanism 120 may be located in front of the image sensor 210, while the field of view 260 is still positioned such that the treatment mechanism 120 can treat identified plants.

The farming machine 200 also has a treatment lag distance 375 along the z-axis between a point of the centerline 362 projected on the ground and the application point 225 of the treatment mechanism 120. The point of the centerline 362 projected on the ground may be the approximate midline of a captured image. The control system 130 captures an image using the image sensor 210 at a first time, identifies a plant in the image, and treats a plant using a treatment mechanism 120 at a second time. Between the first time and the second time, the farming machine 200 travels a distance approximately equal to the treatment lag distance 375. As such, the treatment lag distance 375 and the applicator lag distance 380 are interdependent. In one embodiment, the control system 130 determines a treatment lag distance 375 based on the tilt angle 364 and the applicator lag distance 380. In other embodiments, the control system 130 determines the applicator lag distance 380 and/or the tilt angle 364 based on the treatment lag distance 375. In either case, the treatment lag distance 375 and the applicator lag distance 380 are large enough such that between the first time and the second time, the control system 130 can apply one or more modification functions to the captured image, and employ a plant identification model to identify a plant in the captured image. The control system 130 then actuates a treatment mechanism 120 to individually target and treat the plant. Similar principals can be applied when the treatment mechanism 120 is in front of the image sensor 210 along the z-axis.

The applicator height 385 is a vertical distance along the y-axis between the ground and the application point 225 of the treatment mechanism 120. The applicator height 385 can be variable (e.g., actuating the mounting mechanism up and down), or it can be fixed. In some embodiments, the applicator height 385 is greater than the height of the plants in the field so that the mounting mechanism 140 can pass over a plant without interfering with the plant. In other embodiments, the applicator height 385 is smaller than the plant height so that the treatment mechanism 120 can treat a plant at or near its root or along the plant stem. As such, the treatment mechanism 120 may be configured to pass proximal to a plant, rather than over a plant. The applicator height 385 affects the amount of time taken to apply a treatment to a plant. As an illustrative example, in the case of a spray treatment, for an applicator height 385 of 10 inches, the treatment takes longer to reach a plant than for an applicator height 385 of 5 inches, assuming the plant is the same height in each scenario. The control system 130 can optimize the applicator height 385 such that treatment is applied quickly and precisely, while minimizing interference between the treatment mechanism 120 and the plants in the field.

In one embodiment, the geometric parameters are static during operation. The control system 130 and/or a user (e.g., a driver of a farming machine 200, a mechanic, etc.) sets the parameters prior to operation of the farming machine 200. As such, the tilt angle 364, applicator height 385, and applicator lag distance 380 are constant during operation. In the example of static geometric parameters, the control system 130 sets operating parameters of the farming machine 200 based on the static geometric parameters and/or properties of the image sensor 120. As an example, for the purpose of illustration, the static geometric parameters are as follows: the tilt angle 364 is 25 degrees, the applicator lag distance 380 is 6 inches, the applicator height 385 is 18 inches, and the control system 130 processes an image and actuates a treatment mechanism in 0.25 seconds, including time taken for the treatment to reach a plant with a height of 12 inches. Based on the geometric parameters, the control system 130 sets the operating speed of the farming machine 200 to 5 feet per second (i.e., the farming machine 200 travels at 5 feet per second). In other embodiments, the geometric parameters are determined based on operating parameters. For example, the speed of the farming machine 200 is 4 feet per second during operation, so the control system 130 sets the tilt angle 364 to 20 degrees prior to operation.

In other embodiments, the geometric parameters are dynamic and the control system 130 adjusts one or more of the geometric parameters during operation. For example, the control system 130 adjusts the location of a treatment mechanism 120 to treat an identified plant. Adjusting the treatment mechanism 120 also affects the applicator height 385, the treatment lag distance 375, and/or the applicator lag distance 380. In other examples, the control system 130 adjusts the tilt angle 364 according to operating conditions (e.g., plant height, treatment type) and/or operating parameters (e.g., speed of the farming machine 200). In general, the control system 130 can determine the geometric and operating parameters of the farming machine 200 according to any suitable manner.

In one embodiment, the control system 130 is configured to capture multiple images using dynamic geometric parameters during operation. For example, the control system 130 captures a first image using an image sensor 210 at a tilt angle 364 of 25 degrees. As the control system 130 processes the first image to identify a plant 102 in the image, the control system 130 adjusts the tilt angle 364 of the image sensor 210 to ten degrees. The control system 130 captures a second image with the image sensor at the tilt angle 364 of ten degrees. The control system 130 processes the second image for plant verification, additional intel, image mosaicking, mapping, and/or offline usage while the first image is used for plant identification. The control system 130 can adjust the tilt angle 364 to 25 degrees and repeat the process. Dynamic geometric parameters can allow the control system 130 to capture images for different purposes (e.g., training the system, plant verification, plant identification, etc.) leading to an improved plant identification and treatment process.

As described above, one or more of the geometric parameters may be related to one or more operating conditions of the farming machine 200. Some operating conditions of the farming machine 200 include speed, direction, treatment type, etc. As an illustrative example, the control system 130 may adjust a tilt angle 364 of the farming machine based on the speed at which the farming machine is travelling. In another example, the control system 130 may adjust the applicator height 385 based on the treatment type of the farming machine 200. Of course, the control system 130 may adjust other geometric parameters based on operating conditions of the farming machine 200. In some examples, the control system 130 adjusts operating conditions according to the geometric parameters of the farming machine 200. For example, the control system 130 may change the speed of the farming machine based on the tilt angle 364 of the image sensor 210.

V. Image Processing and Plant Identification

To improve the plant identification process, the control system 130 applies one or more image processing functions to images captured by image sensors 210 to identify a plant for treatment. The image processing functions include cropping, keystoning, scaling, shifting, stabilizing, debayering, white balancing, resizing, exposure control, and color correction, reflectance adjustment, and value normalization. In some examples, the control system 130 applies one or more image processing functions based on geometric and/or operating parameters of the farming machine 200.

V.I. Active Regions in Aggregate Images

Figure 4A:
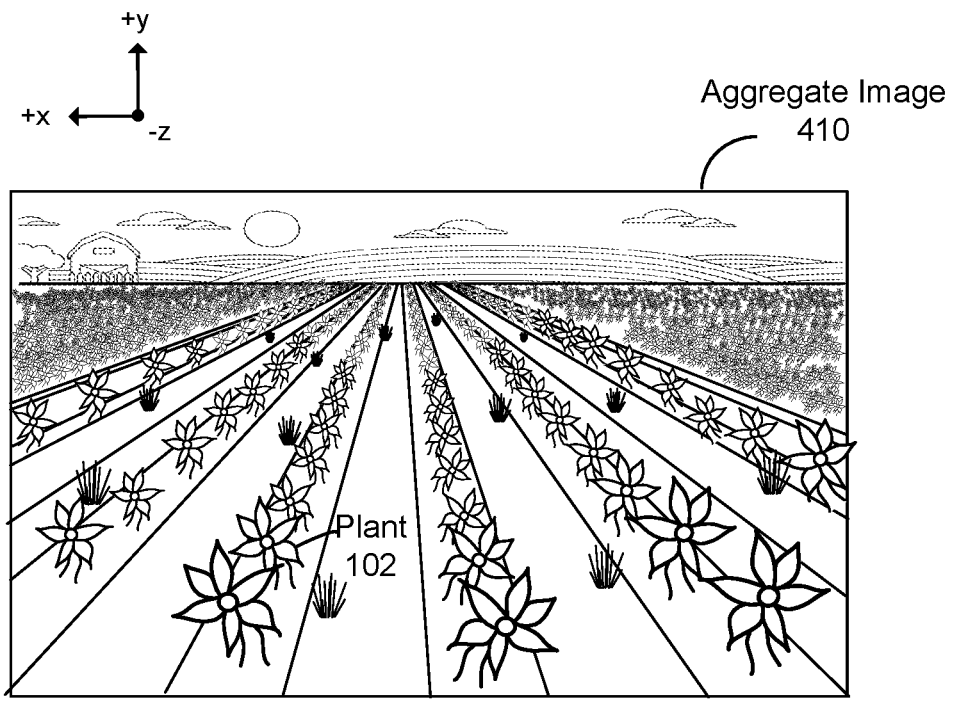
FIG. 4A illustrates an aggregate image captured by an array of image sensors, in accordance with an example embodiment.

FIG. 4A illustrates an aggregate image captured by an array of image sensors, in accordance with an example embodiment. The aggregate image 410 is representative of the combined fields of view from the array of image sensors 210 on the farming machine 200 at a given time as the farming machine 200 moves along the +z direction in the geographic area 104, such as a field. The farming machine 200 continuously captures images of the field as it moves, and identifies plants 102 to treat as it travels over the identified plants 102. The array of image sensors 210 is configured to capture images simultaneously at a predetermined frequency (e.g., every 15 seconds, every 0.5 seconds), and the aggregate image 410 can be generated by combining images that are captured by the array of image sensors 210 at the same time.

It is unnecessary to perform image processing on the entire aggregate image 410 because there are extraneous regions in the aggregate image 410. For example, plants 102 at a location in a region of the field past an upper threshold distance from the farming machine 200 cannot be individually detected due to limitations in the resolution of images captured by the array of image sensors 210, so pixels corresponding to the region past the upper threshold distance from the farming machine 200 do not provide valuable information. Additionally, the control system 130 requires time between receiving the images captured by the array of image sensors 210 and treating the plants 102 identified in the images for performing image processing on the images and actuating the treatment mechanism to target the identified plants 102. Therefore, the farming machine 200 cannot identify and treat plants 102 that are located within a lower threshold distance from the farming machine 200 before the farming machine 200 travels past these plants. The plants 102 located within the lower threshold distance have already been identified in an earlier set of images, and do not need to be re-identified from the plurality of images. Therefore, pixels corresponding to a region within the threshold distance from the farming machine 200 can be discarded as well. The aggregate image 410 is merely a representation used to illustrate a total field of view of the array of image sensors 210 and is not generated by the control system 130. Instead, as described below with respect to FIGS. 7A-7D, the control system 130 crops the images to include active pixels and stitches the cropped images to generate a tiled image that is applied with image processing functions for detecting plants 102.

Figure 4B:
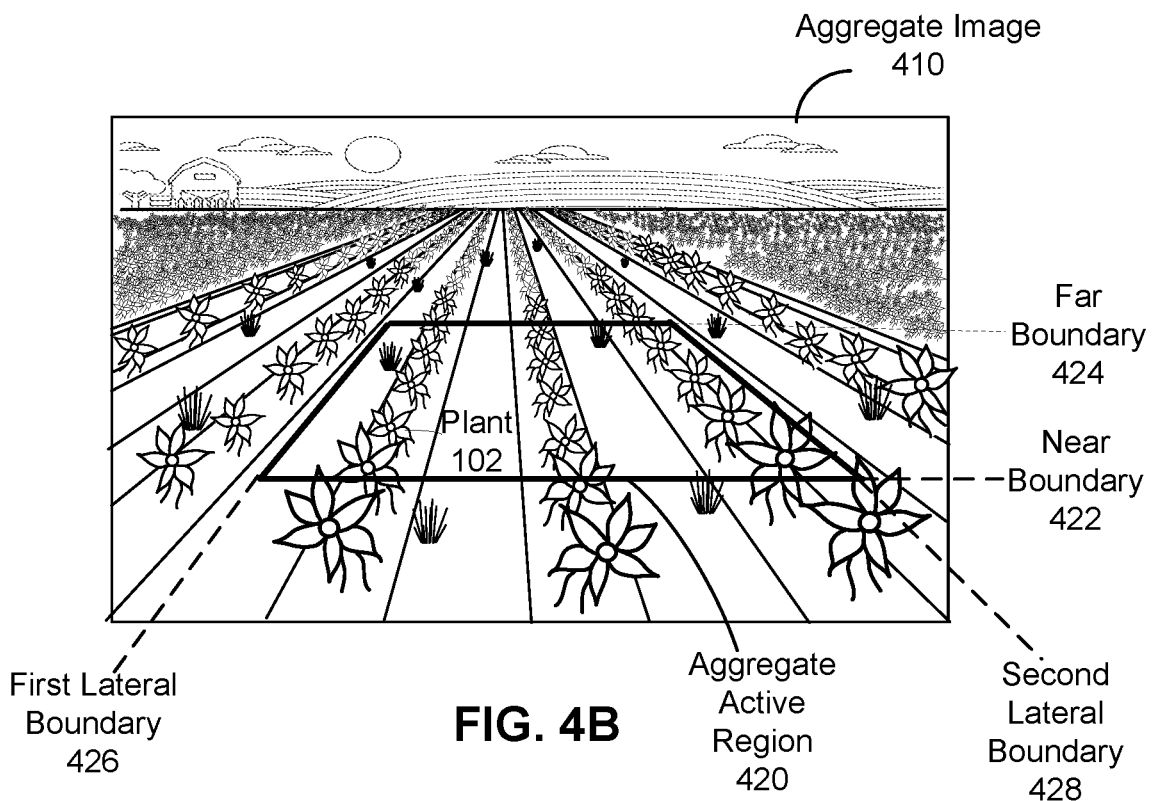
FIG. 4B illustrates the aggregate image of FIG. 4A with an active region at a first location, in accordance with an example embodiment.
Figure 4C:
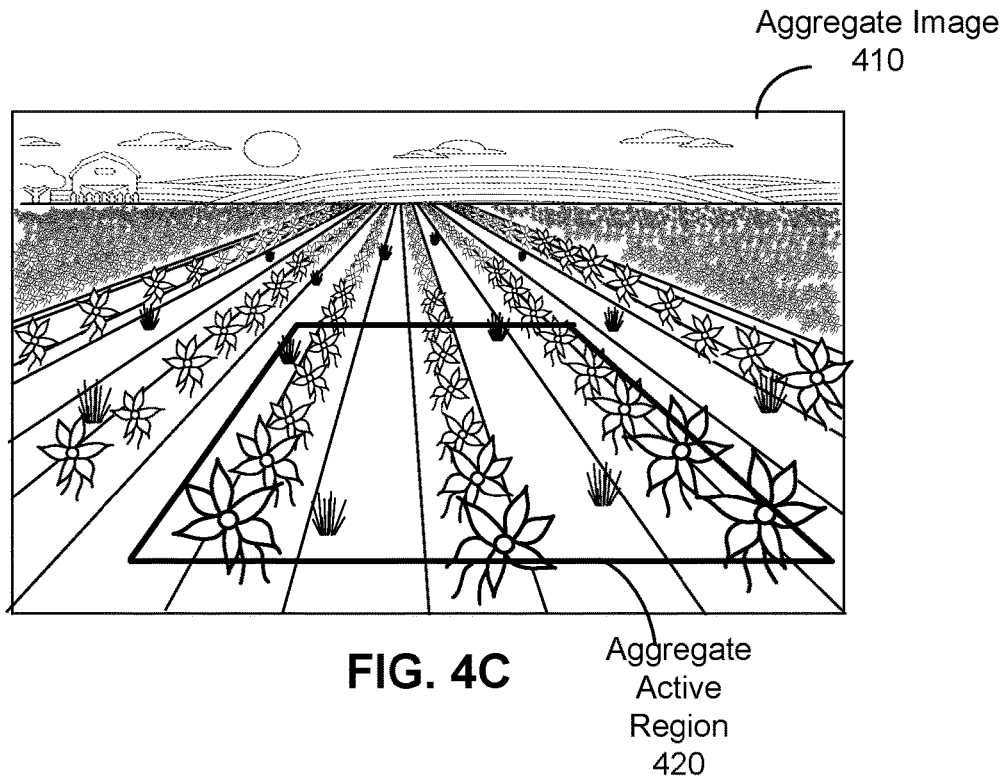
FIG. 4C illustrates the aggregate image of FIG. 4A with an active region at a second location, in accordance with an example embodiment.
Figure 4D:
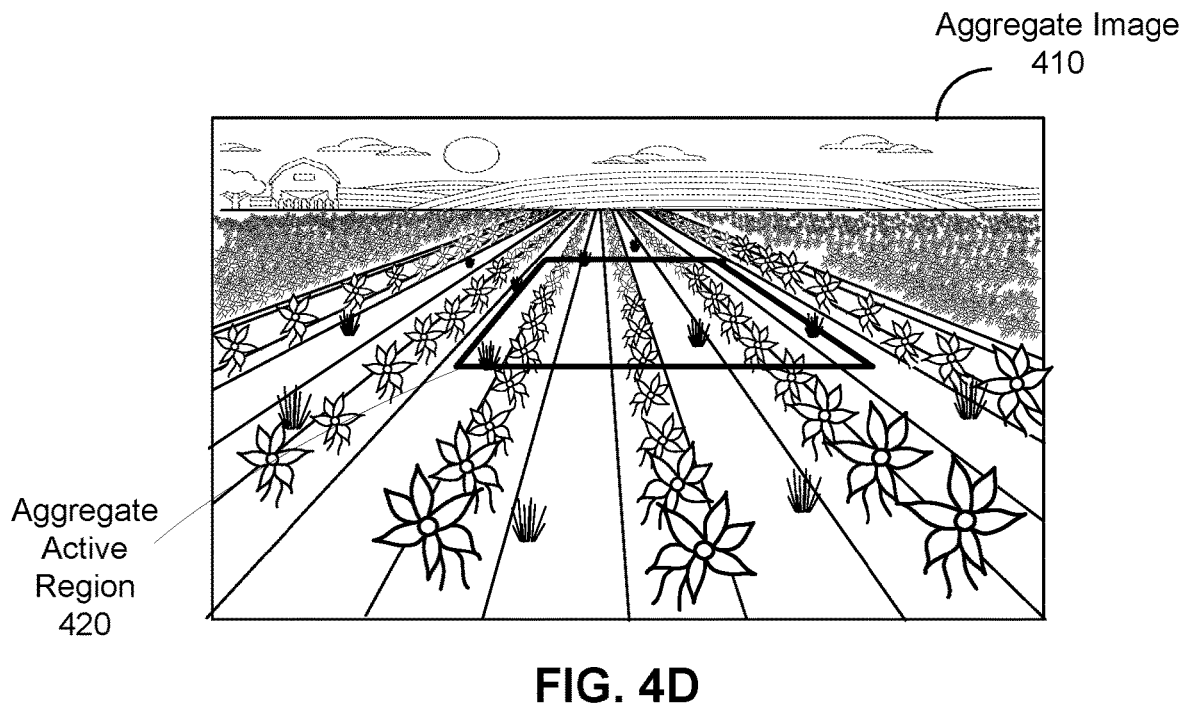
FIG. 4D illustrates the aggregate image of FIG. 4A with an active region at a third location, in accordance with an example embodiment.

To improve accuracy and efficiency of plant detection, the control system 130 of the farming machine 200 identifies an aggregate active region 420 within a set of images captured by the array of image sensors 210 at a given time based on geometric and/or operating parameters of the farming machine 200 and conditions of the field. Geometric parameters may include parameters related to locations of the image sensor 210, the mounting mechanism 140, and the treatment mechanism 120 on the farming machine 200, as well as the tilt angle 364 of the image sensor 210, the applicator height 385, the applicator lag distance 380, a full field of view 260, a cropped field of view 266, and a treatment lag distance 375. Operating parameters of the detection mechanism 110 may include image processing time, image capture intervals, image capture settings, image resolution of the image sensors 210, speed at which the farming machine 200 is traveling, type of treatment being applied to the plants 102, and amount of treatment being applied to the plants 102. Conditions of the field may include height of plants 102 in the field, types of plants 102, weather conditions, and objects in the path of the farming machine 200. FIGS. 4B-4D illustrate different example locations of the aggregate active region 420 within the aggregate image 410 when geometric and/or operating parameters and conditions vary.

FIG. 4B illustrates the aggregate image 410 of FIG. 4A with the active region 420 at a first location, in accordance with an example embodiment. The aggregate active region 420 includes a near boundary 422 at a first distance from the farming machine 200 and a far boundary 424 at a second distance from the farming machine 200 that is greater than the first distance. The near boundary 422 and the far boundary 424 are connected by a first lateral boundary 426 and a second lateral boundary 428. A distance between the first lateral boundary 426 and the second lateral boundary 428 depends at least in part on a span of the treatment mechanisms 120 on the farming machine 200 such that any plant 102 captured within the identified aggregate active region 420 may be treated by the treatment mechanisms 120.

In some embodiments, the near boundary 422 is determined based on a minimum amount of time that the control system 130 requires for identifying a plant in the field. The near boundary 422 represents a location in the field at a minimum distance relative to the farming machine 200 that allows the control system 130 to have sufficient time to detect and identify a plant 102 before the farming machine 200 travels past the plant 102. The far boundary 424 is determined based on a maximum distance relative to the farming machine 200 that allows the farming machine 200 to identify individual plants 102 with a threshold accuracy level. The far boundary 424 may be additionally or alternatively determined based a function relating the distance travelled for each frame captured (at the image capture and processing frequency of the image sensor 210 and or control system 130) and the amount of overlap desired between successive image captures. When plants 102 lie farther from the farming machine 200 than the far boundary 424 of the aggregate active region 420, the accuracy of the detection is below the threshold accuracy level and is unreliable.

In some embodiments, the near boundary 422 and the far boundary 424 of the active region 410 is determined as a function of speed of the farming machine 200. As the speed of the farming machine 410 increases, a distance between near boundary 422 of the aggregate active region 420 and the farming machine 200 required for the control system 130 to detect plants 102 before passing over the plants 102 also increases. For example, when the farming machine 200 is moving at a first speed (e.g., between 5 miles per hour and 10 miles per hour), the active region 410 is at the first location as shown in FIG. 4B. When the farming machine 200 is moving at a second speed greater than the first speed (e.g., greater than 10 miles per hour), the active region 410 is at a second location farther from the first location as illustrated in FIG. 4C. When the farming machine 200 is moving faster, the active region 410 is farther from the farming machine 200 such that the control system 130 has sufficient time to perform image processing on the active region 410 before the farming machine 200 passes over plants 102 detected in the active region 410. Conversely, when the farming machine 200 is moving at a third speed less than the first speed (e.g., less than 5 miles per hour), the active region 410 is at a third location closer than the first location as illustrated in FIG. 4D. Although the active region 410 is located closer to the farming machine 200, since the farming machine 200 is moving slower, the control system 130 can identify and detects plants 102 before the farming machine 200 passes over the plants 102.

In some embodiments, the near boundary 422 and the far boundary 424 are at fixed distances relative to the farming machine 200. The distances may be relative to treatment mechanisms 120 of the farming machine 200. The near boundary 422 may corresponds to a location in the field at a lower threshold distance (e.g., 2 m) from the farming machine 200, and the far boundary 424 may correspond to a location in the field at an upper threshold distance (e.g., 5 m) from the farming machine 200.

In some embodiments, the aggregate active region 420 has a fixed shape and dimension, and the control system 130 adjusts the location of the aggregate active region 420 with respect to the aggregate image 410 according to geometric and/or operating parameters of the farming machine 200. For example, when the farming machine 200 changes its speed as it moves through the field, the control system 130 shifts the location of the aggregate active region 420 closer toward the farming machine 200 or farther away from the farming machine 200. In alternate embodiments, the control system 130 may further adjust the shape and the dimension of the aggregate active region 420 according to geometric and/or operating parameters of the farming machine 200. When the farming machine 200 changes its speed, the control system 130 may change the shape and dimension of the aggregate active region 420 in addition to moving the location of the aggregate active region 420.

In some embodiments, pixels that are not included in the aggregate active region 420 may be used to predict locations of plants 102 or an aggregate active region 420 of a next set of images to be captured by the image sensors 210. As the farming machine 200 travels through the field, it is important for the farming machine 200 to identify and treat each of the plants in the field. To avoid a gap between the aggregate active region 420 of one set of images and the aggregate active region 420 of a subsequent set of images (e.g., taken 0.5 seconds later, taken 5 seconds later), the control system 130 may use the pixels that are not included in the aggregate active region 420 to determine the location of the subsequent aggregate active region 420.

In some embodiments, the control system 130 may adjust the aggregate active region 420 based in part on data collected by the verification mechanism 150. As described above with respect to FIG. 1A-1E, the verification mechanism 150 may be positioned in an opposite direction to the direction of travel of the farming machine 200 and used to determine parameters to monitor accuracy of the treatment mechanism 120. After passing over the one or more plants 102 within an aggregate active region 420, the control system 130 may determine whether the treatment mechanism 120 was able to accurately treat the one or more plants 102 based on information from the verification mechanism 150. For example, if the treatment mechanism 120 is configured to apply a treatment on top of a plant 102, the verification mechanism 150 may capture one or more images of the plant 102 and determine whether the treatment was accurately applied onto the plant 102 or if the treatment was applied to a weed or soil near the one or more plants 102 instead. The control system 130 may determine a deviation between the location of the plant 102 and the location that the treatment was actually applied and update future aggregate active regions 420 based on the deviation by adjusting one or more of the near boundary 422, the far boundary 424, the first lateral boundary 426, or the second lateral boundary 428 for future aggregate active regions 420.

In some embodiments, the control system 130 determines a far boundary 424 of the aggregate active region 420 based on occlusion areas caused by one or more objects within the active region. Given the configuration of the farming machine 200, when one or more objects (e.g., plants, weed, farming equipment) within the active region exceeds a threshold dimension, areas that lie behind the one or more objects may not be visible to the image sensors 210 despite being within fields of view of the image sensors 210. For example, if a tall weed lies in front of a plant 102, the plant 102 may not be visible because the weed is blocking the line of sight of the image sensors 210 to the plant 102. When at least a portion of the aggregate active region 420 is occluded by the one or more objects, the control system 130 updates the aggregate active region 420 by adjusting the far boundary 424 to remove at least a portion of the occlusion areas from the aggregate active region 420.

In some embodiments, the control system 130 determines a target active region that represents a portion within the aggregate image 410 that is most likely to be clear and accurate. For example, image edges and/or corners may be more subject to warping, discoloration, etc. which can lead to misidentification of plants, so the target active region may include a center region of the aggregate image 410 that does not include edges and/or corners. Similarly, the target active region may be determined by the control system 130 based in part on previous treatments performed by the farming machine 200.

In some embodiments, the target active region may be predetermined and preprogrammed onto the control system 130 based on specification of image sensors, control system 130, types of image processing functions performed on the captured images, and the like. The target active region may further be determined based on a portion of the field that is a target size and a target shape, a target near boundary, a target far boundary, a target number of overlap regions, a target size of overlap regions, a target distance from the overlap regions to the plurality of treatment mechanisms, and an average height of one or more plants in the field.

When the array of image sensors 210 captures a set of images of the field, the control system 130 identifies the aggregate active region 420 and compares the aggregate active region 420 to the target active region. When the control system 130 determines that the identified aggregate active region 420 and the target active region are not the same, the control system 130 generates instructions to modify a configuration of the farming machine 200 to align the aggregate active region 420 with the target active region. For example, if the target active region lies in the center region, as illustrated in FIG. 4B, and the identified aggregate active region 420 lies farther from the farming machine 200, as illustrated in FIG. 4C, the control system 130 may adjust a speed of the farming machine 200, adjust tilt angle of image sensors 210, modify optics of image sensors 210 (e.g., adjust focal length), to cause the identified active region 420 with the target active region. The control system 130 continuously compares the target active region to identified aggregate active region 420 to align the identified aggregate active region 420 to the target active region as the farming machine 200 makes its way through the field.

V.II. Active Regions from Single Images

Figure 5A:
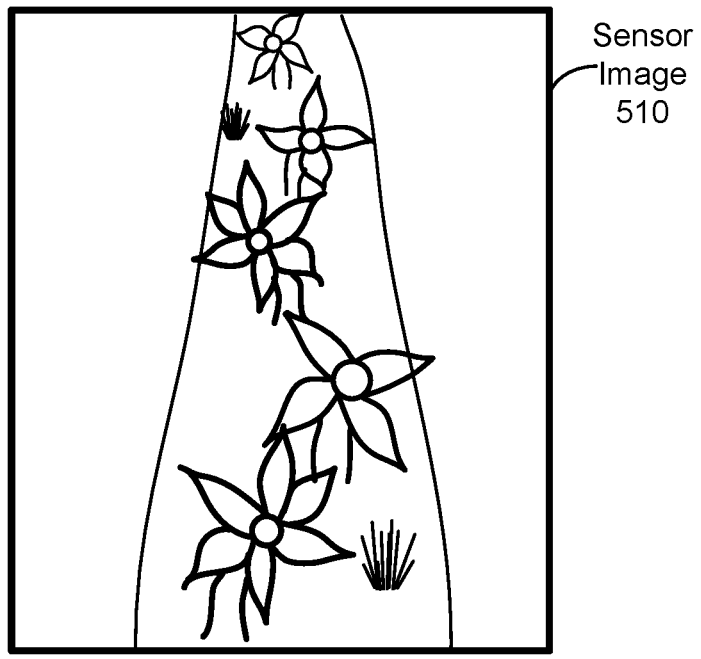
FIG. 5A illustrates a sensor image captured by an image sensor, in accordance with an example embodiment.

Aggregate images 410 and aggregate active regions 420 are generated from a plurality of sensor images. FIG. 5A illustrates a sensor image captured by an image sensor, in accordance with an example embodiment. A sensor image 510 represents an image captured by one of the image sensors 210 from the array of image sensors 210. In some embodiments, each image sensor 210 may be aligned with a particular row of plants such that the image sensor 210 is configured to capture images of plants in the same row as the farming machine 200 travels. As described with respect to FIGS. 4A-4D, the aggregate image 410 illustrates a combination of images of different fields of view captured by the array of image sensors 210 and includes an aggregate active region 420 that spans across a plurality of rows. In comparison, the sensor image 510 illustrates a portion of the aggregate image 410 (e.g., one of the rows) captured by one image sensor 210. Each of the array of image sensors 210 is configured to capture sensor images 510 of a different row in the field. Each sensor image 510 includes a plurality of active pixels representing an active region 520 that the farming machine 200 is configured to treat. Each image sensor 210 is associated with a treatment mechanism configured to treat the active region 520 captured by the image sensor 210. The control system generates a tiled image by identifying active regions 520 in sensor images 510 captured at the same time and stitching cropped images including the active regions 520 together, as described below with respect to FIGS. 7A-7D. In other words, a tiled image is an image of the aggregate active region.

Figure 5B:
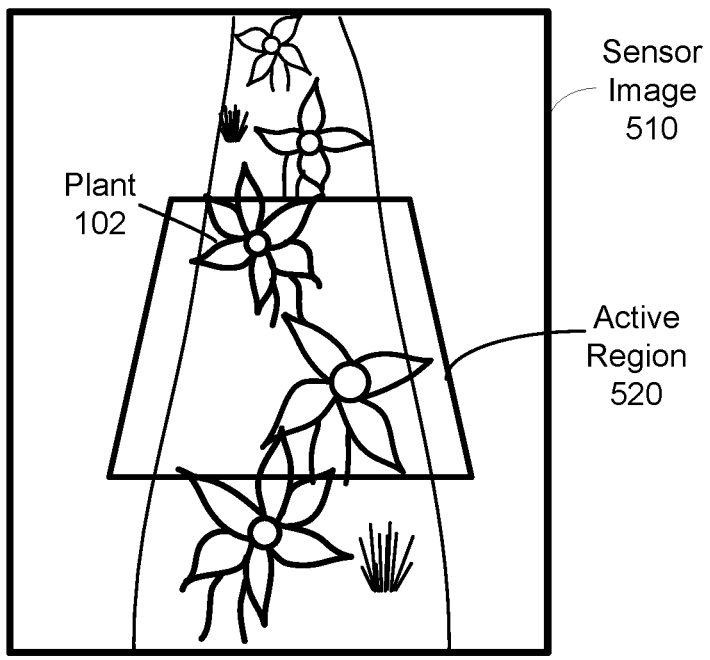
FIG. 5B illustrates the sensor image of FIG. 5A with an active region at a first location, in accordance with an example embodiment.

FIG. 5B illustrates the sensor image 510 of FIG. 5A with an active region 520 at a first location, in accordance with an example embodiment. The active region 520 at the first location is in a center region of the sensor image 510. The first location may be a default location for the active region 520 because the center region is less likely to have inaccurate image data due to distortion and warping compared to edges and corners of the sensor image 510. The active region 520 is represented by a plurality of active pixels in the sensor image 510 and corresponds to a region within the field that the farming machine 200 will treat after detecting plants 102 within the active region 520.

Figure 5C:
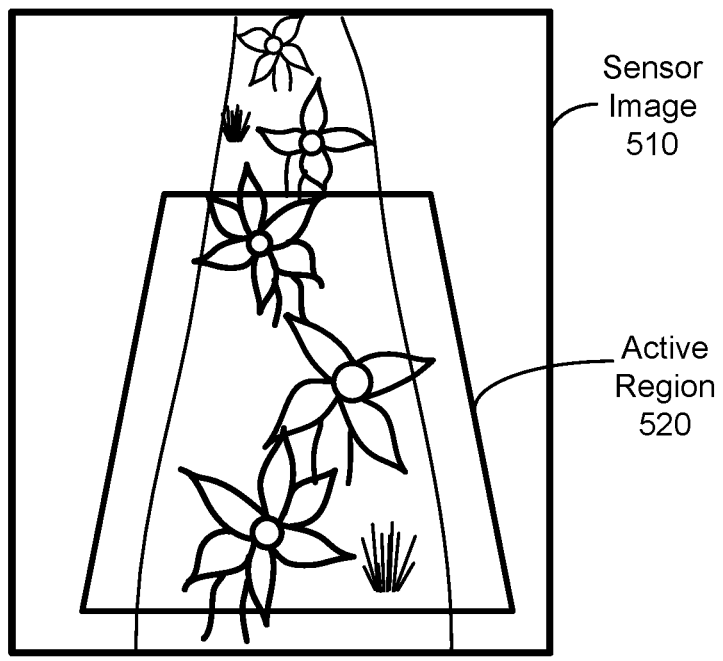
FIG. 5C illustrates the sensor image of FIG. 5A with an active region at a second location, in accordance with an example embodiment.

FIG. 5C illustrates the sensor image of FIG. 5A with an active region at a second location, in accordance with an example embodiment. As discussed above with respect to FIGS. 4A-4D, the aggregate active region 420 may be at different locations and/or have different shapes and sizes within the aggregate image 410 based on geometric and/or operating parameters of the farming machine and conditions of the field. In the same way, the active region 520 of the sensor image 510 captured by a single image sensor 210 can be at different locations and/or have different shapes and sizes. The control system 130 identifies the active region 520 at the second location in FIG. 5C that is closer to the farming machine 200 compared to the active region 520 at the first location in FIG. 5B. For example, when the control system 130 identifies the active region 520 at the second location, the farming machine 200 may be traveling at a higher speed compared to when the control system 130 identifies the active region 520 to be at the first location.

Figure 5D:
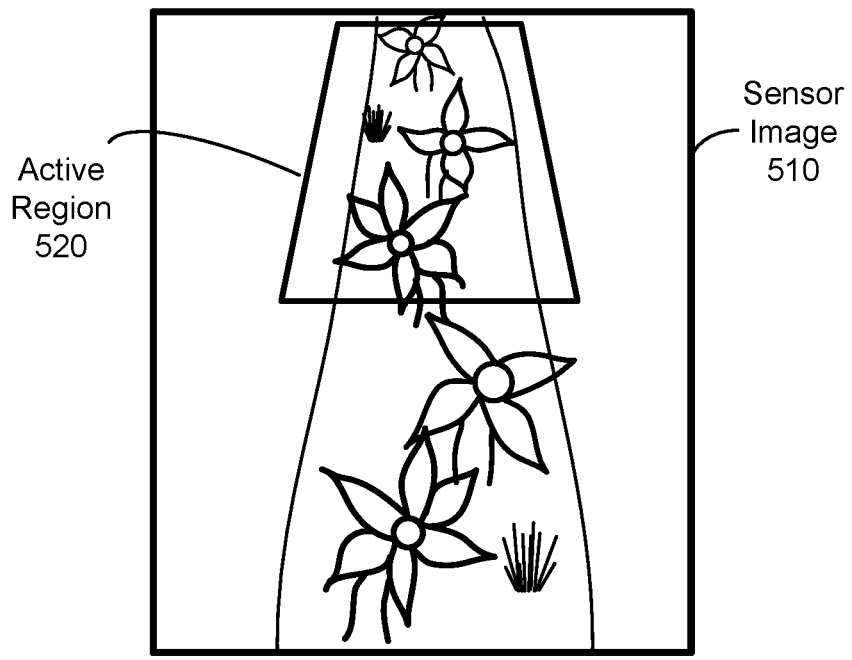
FIG. 5D illustrates the sensor image of FIG. 5A with an active region at a third location, in accordance with an example embodiment.

FIG. 5D illustrates the image of FIG. 5A with an active region at a third location, in accordance with an example embodiment. In FIG. 5D, the active region 520 is at the third location that is farther from the farming machine 200 compared to both the first location illustrated in FIG. 5B and second location illustrated in FIG. 5C. The control system 130 identifies the active region 520 to be at the third location responsive to determining that the farming machine 200 is moving at a slower speed than instances in which the action region 420 is identified to be at the first location or the second location were identified.

In some embodiments, the array of image sensors 210 are tilted at a uniform tilt angle. In other embodiments, image sensors 210 have different tilt angles. For example, a first set of image sensors 210 has a first tilt angle of less than 35 degrees relative to a vector orthogonal to a direction of travel of the farming machine 200 while a second set of image sensor 210 has a second tilt angle of greater or equal to 35 degrees relative to the vector orthogonal to the direction of travel. That is, the second set of image sensors 210 are positioned to capture images of portions of the field farther from the farming machine 200 than the first set of image sensors 210. Because the second set of image sensors 210 correspond to fields of view that extends farther, the control system 130 may initially use images captured by the second set of image sensors 210 to determine whether there are plants 102 ahead of the farming machine 200. If the control system 130 determines that there are plants 102 in the second set of image sensors 210, the control system determines that it is necessary to use the first set of image sensors 210 for a more precise detection of the plants 102. When the farming machine 200 approaches closer to the plants 102, the farming machine 200 captures images using the first set of image sensors 210 and generate a tiled image based on the images captured by the first set of image sensors 210 for detecting plants 102 to treat and actuating the treatment mechanisms 120. On the contrary, if the control system 130 determines that there are no plants 102 based on the second set of image sensors 210, the control system may not capture images using the first set of image sensors 210 or skip image processing on the first set of images, which can improve processing efficiency.

When the first set of image sensors 210 has a first tilt angle of less than 35 degrees and the set of image sensors 210 has a second tilt angle greater or equal to 35 degrees, the control system 130 may interleave the first set of images captured by the first set of image sensors 210 with the second set of images captured by the second set of image sensors 210. For example, the control system 130 may capture a second tiled image using the second set of image sensors 210, then a first tiled image using the first set of image sensors 210. In this manner, the control system 130 may identify plants 102 using various cameras and in various active regions, without continuously capturing images across all image sensors 210. In some instances, plant identification in the second tiled images may trigger capturing the first tiled image and identifying plants 102. For example, the second tilt image may be used to identify plants 102 farther away from the farming machine 200, but the resolution in plant identification is lower because the plants 102 are farther away. The farming machine 200 may interleave a first tiled image from an active region closer to the farming machine 200. Because the first active region is nearer the farming machine 200 the plant identification is at a higher resolution. This process can also occur without interleaving the images. That is the farming machine 200 can use the tiled images from different image sensors 210 for lower resolution, and higher resolution plant identification.

In some embodiments, different images captured by the image sensors 210 may include an active region 520 at different locations. For example, the image sensors 210 continuously capture a set of images at a predetermined frequency (e.g., every 15 seconds, every 0.5 seconds). Within this set of images, each image ("frame") may sequentially be assigned to a number representing an order in which the frame was captured. The control system may then use a first set of frames to identify plants in a first active region, and a second set of frames to identify plants in a second active region. In this manner, the different active regions are selected from interleaved frames of the video. For example, the control system 130 identifies an active region 520 at a first location (e.g., as illustrated in FIG. 5B) for odd numbered frames and identifies an active region 520 at a second location (e.g., as illustrated in FIG. 5C) for even numbered frames. Using this method, the control system 130 may rely on tiled images generated from odd numbered frames that capture a portion of the field that is located farther away from the farming machine 200 for detecting plants 102 to be treated and use tiled images generated from even numbered frames that capture a portion of the field that is located closer to the farming machine 200 for imaging the ground.

In some embodiments, image sensors 210 have rolling shutters and capture images by scanning pixels row by row (or column by column) instead of exposing all of the pixels at the same instant for a given image frame. In an example, the image sensors 210 captures a plurality of image portions of an image frame over a period of time from a top of the image to a bottom of the image. As a result, there is a time delay between a time at which a first row of pixels at the top of the image is captured and a time at which a last row of pixels at the bottom of the image is captured. Thus, each image frame may be divided into a plurality of image portions, and the control system 130 may identify a tiled image for each of the plurality of image portions. For example, responsive to image sensors 210 capturing a first image portion (e.g., top portion) of an image, the control system 130 may identify a first active region 520 for the first image portion and generate a first tiled image based on the first active region 520. When the image sensor 210 captures a second image portion (e.g., middle portion) of the image, the control system 130 may identify a second active region 520 different from the first active region 520 for the second image portion and generate a second tiled image based on the second active region 520. The control system 130 continues to determine when the image sensors 210 complete capturing an image portion and generates a tiled image for each of the remaining image portions. Different tiled images within a same image frame may be applied with different sets of image processing functions. For example, the tiled image generated from the first active region 520 at the top of the image may be applied with additional functions for making the image sharper compared to the tiled image generated from the second active region 520 at the bottom of the image.

Additionally, or alternatively, the control system 210 may capture different image portions and process each image portion differently. For example, the control system may use a first image portion to identify plants and a second image portion to dynamically map the field. Allowing the control system to process different image portions of the image in different manners has several advantages. For example, the control system 210 may process a first image portion with a function requiring higher processing requirements, while processing a second image portion with a function requiring lesser processing requirements. In another example, the control system may process apply a first function requiring a first field of view (e.g., closer to the farming machine) to the first image portion and a second function requiring a second field of view (e.g., farther from the farming machine) to the second image portion.

In some embodiments, one or more image sensors 210 have global shutters and all of the pixels in the one or more image sensors 210 are exposed simultaneously. When the one or more image sensors 210 have global shutters, the control system 130 may identify a single active region 520 for an image frame.

V.III. Treating Plants Identified in Active Regions

Figure 6A:
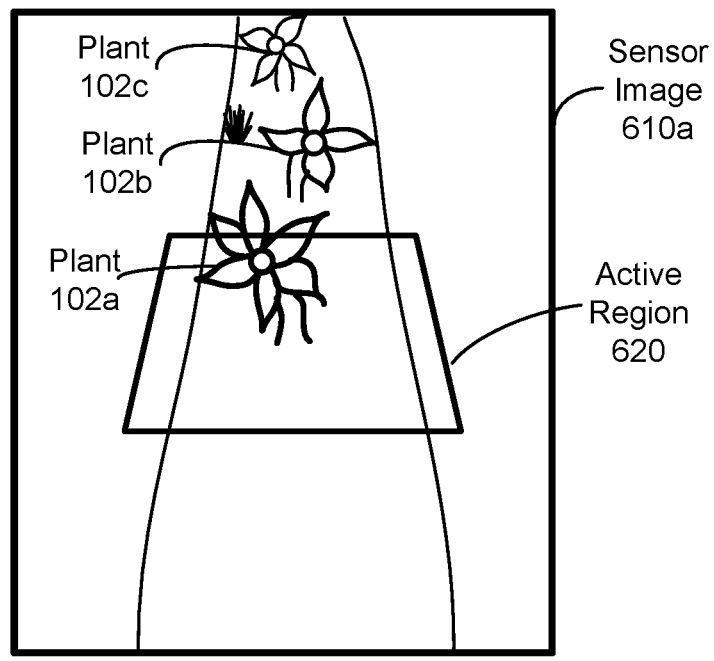
FIG. 6A illustrates a sensor image captured at a first point in time by an image sensor, in accordance with an example embodiment.
Figure 6B:
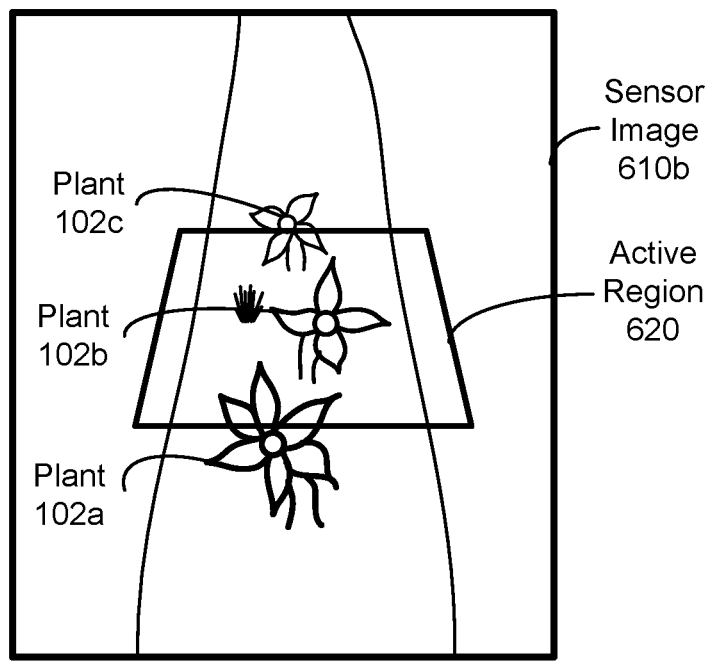
FIG. 6B illustrates a sensor image captured at a second point in time by an image sensor, in accordance with an example embodiment.
Figure 6C:
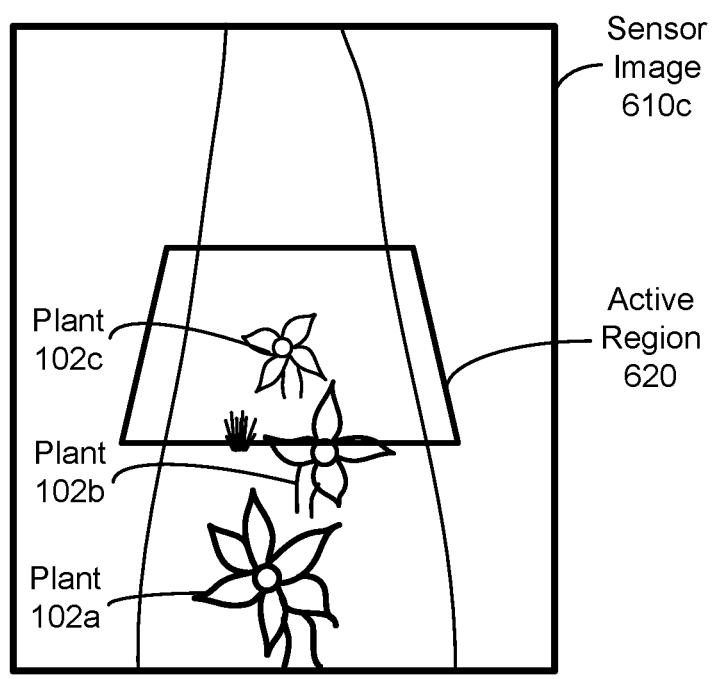
FIG. 6C illustrates a sensor image captured at a third point in time by an image sensor, in accordance with an example embodiment.

FIGS. 6A-6C describes a series of images captured by an image sensor of an array of image sensors as the farming machine 200 travels, identification of plants in the active region, and corresponding treatment of the plants in that active region. A first sensor image 610a illustrated in FIG. 6A, a second sensor image 610b illustrated in FIG. 6B, and a third sensor image 610c FIG. 6C are sequentially captured by a same image sensor 210 taken at a predetermined time interval (e.g., every 15 seconds, every 0.5 seconds) in between subsequent images. The active region 620 of the image sensor 210 may be fixed at a location at a center of sensor images for each of the first sensor image 610a, the second sensor image 610b, and the third sensor image 610c.

In the portion of the field captured by the first sensor image 610a, the second sensor image 610b, and the third sensor image 610c, there is a first plant 102a, a second plant 102b, and a third plant 102c. The first plant 102a is located closest to the farming machine 200, the second plant 102b is located behind the first plant 102b and in front of the third plant 102c that is farthest from the farming machine 200. The action region 620 represents a portion of the field to be treated by the farming machine 200 as the farming machine 200 travels over the portion. There is a time delay between a time at which the sensor image is captured and a time at which the treatment mechanism 120 treats a plant in the active region 620.

FIG. 6A illustrates a sensor image captured at a first point in time by an image sensor, in accordance with an example embodiment. The control system 130 uses active pixels representing the active region 620 of the first sensor image 610a for identifying the first plant 102a to be treated. Although the second plant 102b and the third plant 102c are captured in the first sensor image 610a, since the second plant 102b and the third plant 102c are not included within the active region 620 of the first sensor image 610a, the control system 130 does not identify the second plant 102b and the third plant 102c using the first sensor image 610a. When the control system 130 identifies the first plant 102a in the first sensor image 610a, it stores information associated with the first plant 102a to be used for actuating the treatment mechanism 120 to target the first plant 102a.

FIG. 6B illustrates a sensor image captured at a second point in time by an image sensor, in accordance with an example embodiment. Since the farming machine 200 is moving, when the image sensor captures the second sensor image 610b a predetermined time interval after capturing the first sensor image 610a, the second sensor image 610b captures an image of a different portion of the field compared to the first sensor image 610a. In the second sensor image 610b, the active region 620 may include the second plant 102b but not include the first plant 102a and the third plant 102c. The control system 130 identifies the second plant 102b using active pixels corresponding to the active region 620 in the second sensor image 610b. The control system 130 actuates the treatment mechanism 120 to treat the second plant 102b after treating the first plant 102a.

Similarly, FIG. 6C illustrates a sensor image captured at a third point in time by an image sensor, in accordance with an example embodiment. The active region 620 includes the third plant 102c and does not include the first plant 102a and the second plant 102b. The third plant 102c is treated based on the image processing performed on active pixels included in the active region 620 of the third sensor image 610c after the second plant 102b is treated.

V.IV. Generating a Tiled Image from Sensor Images

FIGS. 7A-7D illustrate a method of generating the tiled image 770 used to identify plants 102 to be treated. Each image sensor 210 may be associated with an independent treatment mechanism 120, and the control system 130 may actuate an associated treatment mechanism 120 based on plants 102 identified within the image captured by the image sensor 210.

Figure 7B:
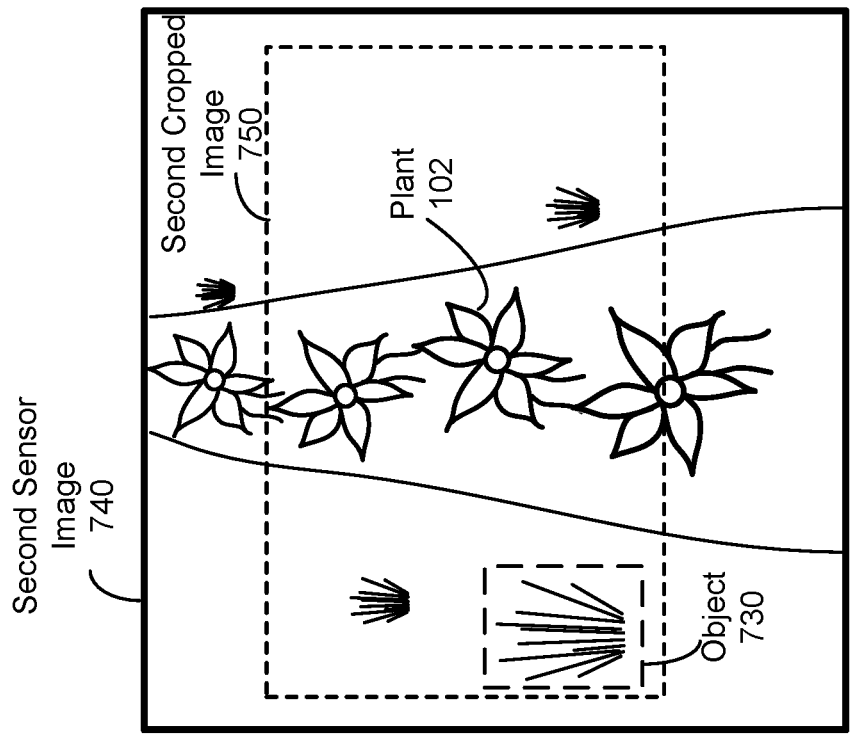
FIG. 7B illustrates a sensor image captured by a second image sensor, in accordance with an example embodiment.
Figure 7A:
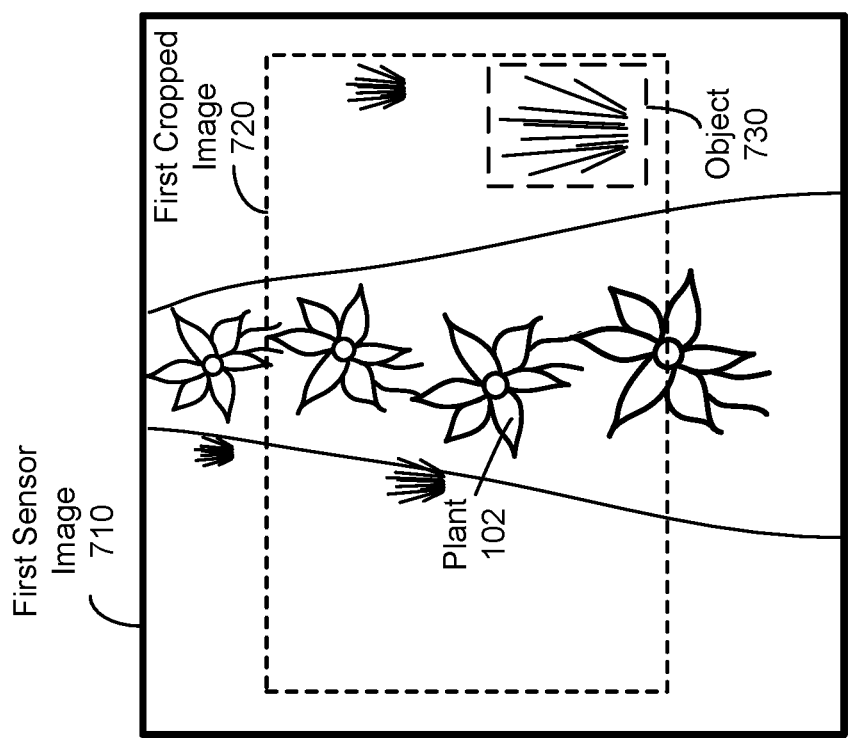
FIG. 7A illustrates a sensor image captured by a first image sensor, in accordance with an example embodiment.

FIG. 7A illustrates a first sensor image 710 captured by a first image sensor, in accordance with an example embodiment. FIG. 7B illustrates a second sensor image 740 captured by a second image sensor, in accordance with an example embodiment. The first image sensor and the second image sensor are configured to capture the first sensor image 710 and the second sensor image 740 looking forward towards the direction of travel 115 and tilted downwards toward the ground at a tilt angle 364. The first image sensor and the second image sensor are disposed adjacent to each other on the farming machine 200 and configured to capture images of adjacent rows on the field.

As discussed above with respect to FIGS. 5A-5D, each of the first sensor image 710 and the second sensor image 740 includes an active region that is represented by a plurality of active pixels. The control system 130 identifies the active region in the first sensor image 710 and generates a first cropped image 720 that includes one or more active pixels, and identifies the active region in the second sensor image 720 and generates a second cropped image 740 that includes one or more active pixels. By cropping the first sensor image 710 and the second sensor image 740 to remove regions that are less suitable for plant identification, the control system 130 can improve plant identification process by reducing time taken to identify plants, computation resources needed for performing the identification, and image capture and transfer times. Within the first cropped image 740 and the second cropped image 750, there may be one or more plants 102 to be treated and one or more objects 730. The one or more objects 730 may be plants 102, weeds, rocks, farming equipment, etc.

Figure 7C:
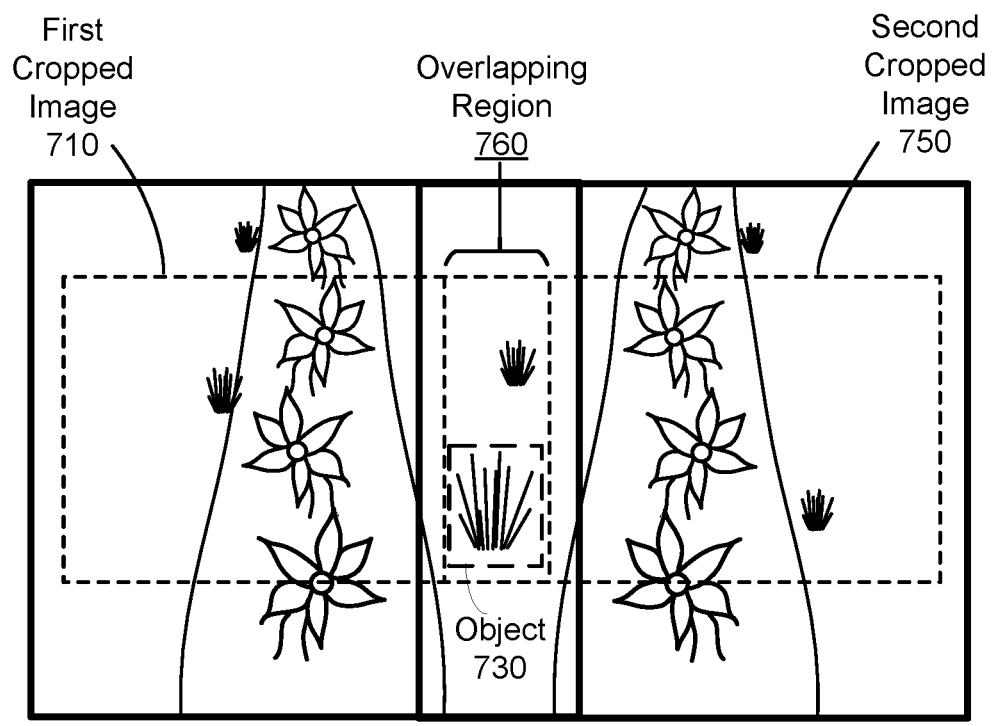
FIG. 7C illustrates the sensor image captured by the first image sensor of FIG. 7A overlapped with the sensor image captured by the second image sensor of FIG. 7B, in accordance with an example embodiment.

FIG. 7C illustrates the image captured by the first image sensor of FIG. 7A overlapped with the image captured by the second image sensor of FIG. 7B, in accordance with an example embodiment. Because the array of image sensors 210 are disposed such that there is an overlapping region in the field of views of two adjacent image sensors 210, there is an overlapping region 760 in the first cropped image 710 and the second cropped image 750. The first cropped image 710 and the second cropped image 750 have one or more same active pixels in the overlapping region 760. The active pixels in the overlapping region 760 may represent one or more objects 730. In other embodiments, the control system 130 may use known geometric parameters of the farming machine 200 or characteristics of the image sensors 120 to stitch the first cropped image 710 and the second cropped image 750 together instead of using pixels corresponding to the object 730 to align the cropped images.

Figure 7D:
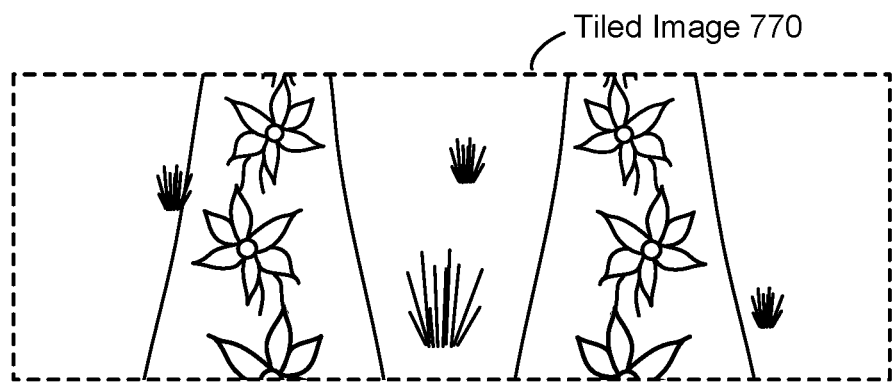
FIG. 7D illustrates a tiled image based on FIG. 7C, in accordance with an example embodiment.

FIG. 7D illustrates a tiled image based on FIG. 7C, in accordance with an example embodiment. The tiled image 770 illustrates the first cropped image 710 and the second cropped image 750 that are stitched together along the overlapping region 760. To accurately generate the tiled image 770, the control system 130 may apply one or more image processing functions to align the active pixels of the first cropped image 710 and the second cropped image 750 in the overlapping region 760. The image processing functions modify one or more characteristics of the first cropped image 710 and/or the second cropped image 750 by performing one or more of cropping, keystoning, scaling, shifting, stabilizing, debayering, white balancing, resizing, controlling exposure, correcting color, adjusting reflectance, or normalizing values. The image processing functions allow the control system to accurately represent objects 730 in the overlapping region 760. For simplicity, the tiled image 770 illustrates a portion of an aggregated tiled image that the control system 130 generates. The aggregated tiled image corresponding to an aggregate active region (e.g., 420) is generated by stitching cropped images from all of the image sensors 210 such that the tiled image 770 includes images of additional rows in the field.

In some embodiments, the overlapping region 760 lies between successive images captured by a same image sensor 210. Although FIGS. 7A-7D illustrates an embodiment in which the overlapping region 760 is between lateral cropped images captured by adjacent image sensors 210, the control system 130 may also generate the tiled image 770 based on images captured at different instances. The control system 130 may cause the image sensors 210 to capture images at a predetermined frequency such that there is an overlap between successive images captured by the same image sensor 210. The predetermine frequency may vary based on operating parameters of the farming machine 200 to ensure that there is sufficient overlapping region between successive images to allow the control system 130 to stitch the images together, but not too much overlapping region that leads to redundant image data.

After generating the tiled image 770, the control system 130 can apply other modification functions to the tiled image 770. For example, the control system 130 can apply a color normalization function such that variations between color in the two images due to lighting effects are removed. After applying modification functions, the control system 130 employs a plant identification model to identify a plant, a plant type, plant features, etc. An example of a plant identification model employed by the control system 130 is described in U.S. patent application Ser. No. 16/126,842 titled "Semantic Segmentation to Identify and Treat Plants in a Field and Verify the Plant Treatments," filed on Sep. 10, 2018, but other plant identification models are also possible. In one example, the control system 130 employs a plant identification model to identify plants 102. Identifying a plant 102 can include determining the type of plant and/or the location of the plant. The control system 130 can also evaluate an identified plant to determine additional plant properties or adjust settings of an image sensor 210. The control system 130 can evaluate characteristics including, for example, Normalized Difference Vegetation Index (NDVI), Transformed Chlorophyll Absorption in Reflectance Index normalized by Optimized Soil-Adjusted Vegetation Index (TCARI/OSAVI), Normalized Difference Red Edge Index (NDRE), Canopy Chlorophyll Content Index (CCCI), Photochemical Reflectance Index (PRI), etc. Additionally, the control system 130 can evaluate plant properties to determine if the plant is healthy and/or if the plant needs treatment. Responsive to identifying a plant in an image, the control system 130 actuates a corresponding treatment mechanism 120 to treat the identified plant.

The image processing functions to be performed may be determined based on a portion of the field that is a target size and a target shape, a target near boundary, a target far boundary, a target number of overlap regions in the array of image sensors 210, a target size of overlap regions in the array of image sensors 210, applicator height 385 of the treatment mechanisms 120, the applicator lag distance 380 between the array of image sensors 210 and the treatment mechanisms 120, a speed of the farming machine 200, a processing speed of the control system 130 on images, a treatment time representing an expected amount of time between actuating the treatment mechanisms 120 and actual delivery of treatment on plants, or height of plants to be treated.

In some embodiments, the control system 130 may generate a cropped image (e.g., first cropped image 720) from a sensor image (e.g., first sensor image 710) and perform image processing on individual cropped images instead of generating the tiled image 770 by stitching the sensor images together before performing the image processing. However, two adjacent cropped images may each include a subset of pixels corresponding to an object, but neither of the cropped images may include all pixels corresponding to the objects. When individual cropped images are applied with image processing functions, the image processing functions may fail to identify the object because it does not have an image of the complete object. When the tiled image 770 that stitches the cropped images together is used, the control system 130 can detect objects 730 in the overlapping region 760.

In some embodiments, the control system 130 may stitch sensor images together to generate an aggregate image (e.g., aggregate image 410) and then identify an aggregate active region 420 from the aggregate image. In FIGS. 7A-7D, the control system 130 generates cropped images from the sensor images and stitches the cropped images together to generate the tiled image 770. However, the control system 130 may stitch sensor images together to generate the aggregate image and then crop the aggregate image to generate the tiled image 770.

VI. Example Implementation

Figure 8:
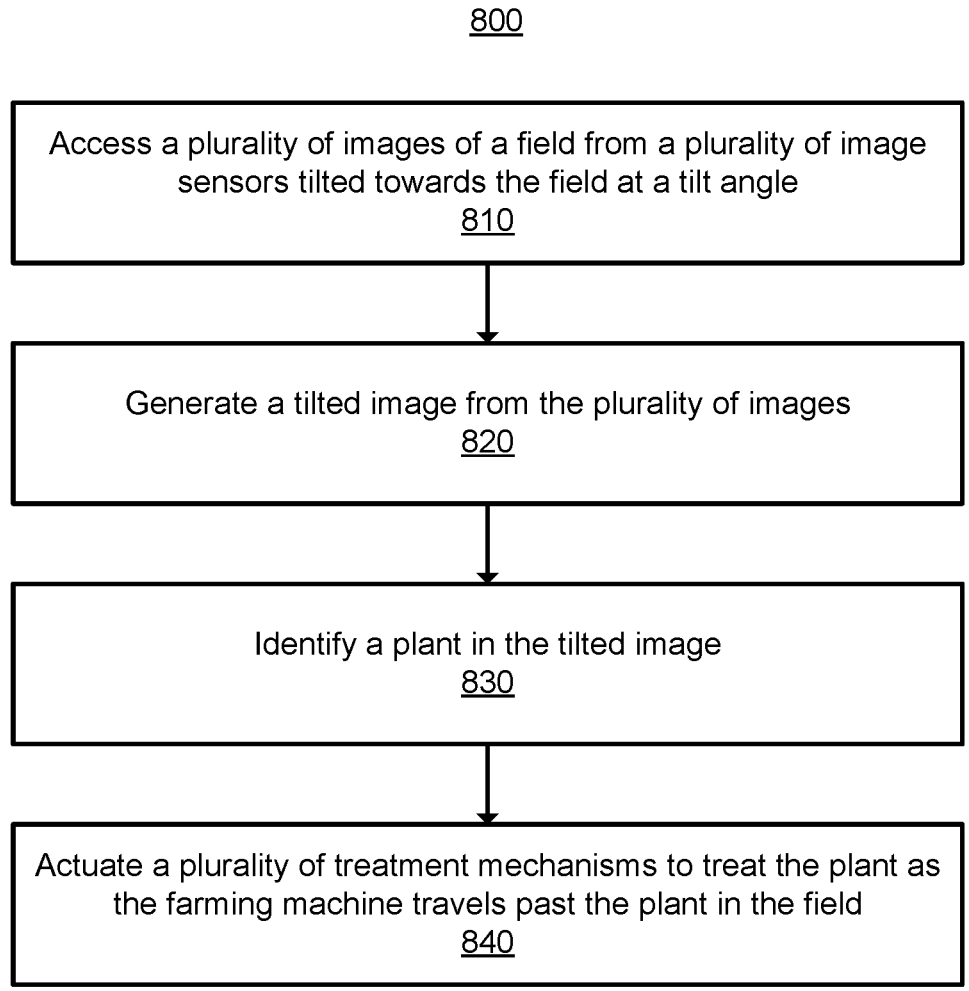
FIG. 8 is a flow chart illustrating a method of identifying and treating a plant, in accordance with an example embodiment.

FIG. 8 is a flow chart illustrating a method of identifying and treating a plant, in accordance with an example embodiment. The steps of FIG. 8 are illustrated from the perspective of a system (e.g., control system 130) with a hardware process or performing the method 800. However, some or all of the steps may be performed by other systems or components. In addition, in some embodiments, the steps may be performed in parallel, in different orders, or asynchronously, and in other embodiments, different steps altogether may be performed.

A farming machine includes one or more image sensors coupled to a mounting mechanism to identify a plant for treatment as the farming machine moves through a field. Traditionally, the farming machine travels slowly to allow for a control system to capture images of the field and identify plants to be treated in real-time using the captured images, which negatively impacts farming efficiency and cost. The real-time adjustment of the imaging system allows the farming machine to capture images using an array of image sensors and dynamically identify an active region within the captured images and discard irrelevant image data from pixels outside of the active region. Because the control system discards the irrelevant image data instead of analyzing the entirety of the plurality of images, the control system can identify plants to treat more quickly and the farming machine can travel at a higher speed without being limited by the processing speed of the control system.

The control system accesses 810 a plurality of images of a field from a plurality of image sensors that are tilted towards the field at a tilt angle. The tilt angle of the plurality of image sensors allow the plurality of image sensors to capture images of plants that lie ahead of the farming machine in a direction of travel of the farming machine. Using the captured images, the control system can identify plants that lie ahead such that the farming machine may target and treat the identified plants as the farming machine travels over the plants. When the plurality of image sensor captures images of the field, the images include a plurality of active pixels that represent an active region of the field to be treated by the farming machine and a plurality of remaining pixels outside of the active region. The plurality of active pixels is used for identifying plants and the remaining pixels are not used for identifying the plants.

Each of the plurality of image sensors is configured to capture a different field of view, and the control system uses a combination of images captured by the plurality of image sensors to determine an aggregate active region including all of the plants that the farming machine is configured to treat at a given time. The control system generates 820 a tiled image from the plurality of images based on the plurality of active pixels. The tiled image is the result of stitching together cropped images including active pixels from individual images captured by the plurality of image sensors. The control system identifies the active region in the images captured by different image sensors and crops the active region from the images. After cropping the images, the control system stitches the cropped images together using pixels representing one or more objects that are captured by different image sensors. For example, images captured by two adjacent image sensors may include a same object (e.g., rock, weed, plant), and the control system identifying an overlapping region including pixels of the same object in the images to stitch the images together. By performing image stitching across all of the cropped images, the farming machine can generate the tiled image including the aggregate active region of the farming machine.

After generating the tiled image, the control system identifies 830 a plant in the tiled image. Based on the identified plant, the control system actuates 840 treatment mechanisms of the farming machine to treat the plant as the farming machine travels past the plant in the field.

VII. Control System

Figure 9:
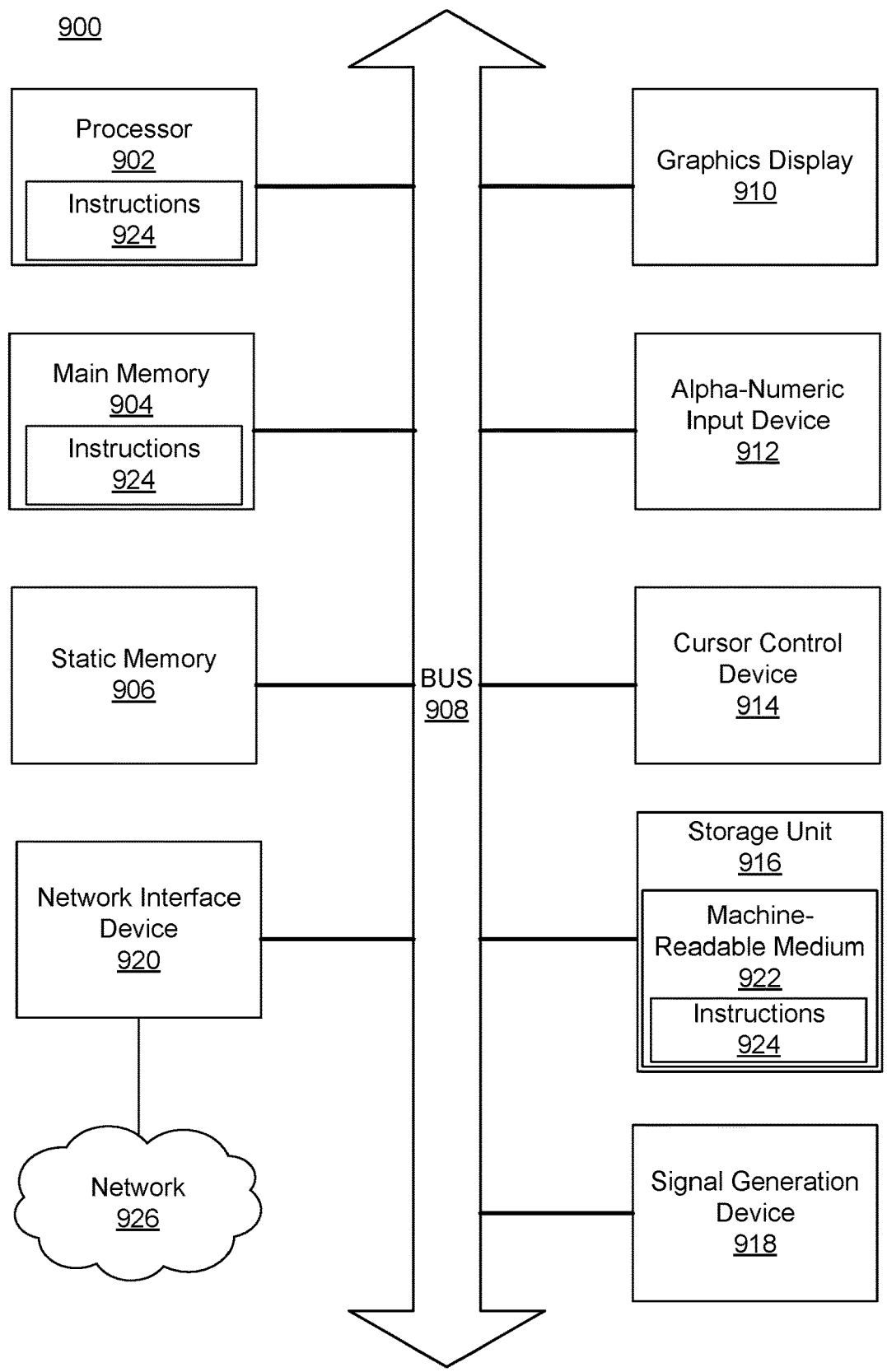
FIG. 9 is a schematic illustrating a control system, in accordance with an example embodiment.

FIG. 9 is a block diagram illustrating components of an example machine for reading and executing instructions from a machine-readable medium. Specifically, FIG. 9 shows a diagrammatic representation of control system 130 in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904, and the storage unit 916 communicate via a bus 908.

In addition, the computer system 900 can include a static memory 906, a graphics display 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. For example, the instructions 924 may include the functionalities of modules of the system 130 described in FIG. 2. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

The control system 130 can comprise a processing unit (e.g., one or more of a CPU, a GPU, or an FPGA) and a data storage medium (e.g., static or dynamic memory). In one embodiment, the control system 130 comprises a deep-learning GPU that is configured to effectively execute a deep-learning neural network. For example, the computer system 900 may include an NVIDIA GeForce® GTX™ TITAN X using the Caffe deep learning framework or the NVIDIA Tx1 or Tx2 using the Tensorflow deep learning framework. Furthermore, image data passed in to the computer instructions may be transmitted to the control system 130 for processing using any type of transmission protocol. For example, the open systems interconnect (OSI) model may be used to send image data from an image sensor 210 to the control system 130 using ethernet connections between these components.

X. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a farming machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

The invention claimed is:

1. A method for treating a plant in a field with a farming machine, comprising:
    accessing a plurality of images of the field from a plurality of image sensors tilted towards the field at a tilt angle, the plurality of images including a plurality of active pixels representing an active region for treating the plant in the field and a plurality of remaining pixels, the active region affected by a configuration of mechanized components of the farming machine;
    responsive to determining the configuration of mechanized components of the farming machine being modified, determining a modified active region based on the modified configuration;
    generating, as the farming machine travels towards the plant in the field, a tiled image from the plurality of images, by:
        identifying the modified active region in the plurality of images;
        generating a plurality of cropped images, the plurality of cropped images including the active pixels corresponding to the modified active region; and
        generating the tiled image including the modified active region by stitching together the active pixels in the plurality of cropped images;
    identifying the plant in the tiled image; and
    actuating a plurality of treatment mechanisms to treat the plant as the farming machine travels past the plant in the field.

2. The method of claim 1, wherein the active region comprises:
    a near boundary representing a location in the field where the plant can be identified by a controller before the farming machine travels past the plant in the field; and
    a far boundary representing a location in the field where an identification accuracy of the plant is below a threshold accuracy level.

3. The method of claim 2, wherein the far boundary is determined based on an occlusion area associated with an object within the active region, the occlusion area corresponding to an area behind the object that is not visible to the plurality of image sensors.

4. The method of claim 1, wherein the active region comprises:
    a near boundary representing a location in the field at a lower threshold distance from the plurality of treatment mechanisms; and
    a far boundary representing a location in the field at an upper threshold distance from the plurality of treatment mechanisms.

5. The method of claim 1, wherein identifying the modified active region comprises:
    calculating the modified active region for the farming machine as it travels through the field based on a configuration of the farming machine.

6. The method of claim 1, generating the tiled image from the plurality of images further comprises:
    identifying an overlapping region in a first cropped image and a second cropped image of the plurality of cropped images, the overlapping region comprising one or more active pixels in each of the first cropped image and second cropped image representing one or more same objects; and
    applying one or more image processing functions to the one or more active pixels in the overlapping region such that the one or more same objects are accurately represented in the tiled image.

7. The method of claim 6, wherein applying the one or more image processing functions to the one or more active pixels modifies one or more characteristics of the first cropped image or the second cropped image by performing one or more of the following operations: cropping, keystoning, scaling, shifting, stabilizing, debayering, white balancing, resizing, controlling exposure, correcting color, adjusting reflectance, or normalizing values.

8. The method of claim 6, wherein the identified plant is in the overlapping region.

9. The method of claim 1, wherein generating the plurality of cropped images comprises:
    applying one or more image processing operations to one or more images of the plurality of images to modify one or more characteristics of the one or more images, the image processing operations selected based on at least one of:
        the tilt angle,
        a height of the plurality of treatment mechanisms above the field,
        a distance between the plurality of treatment mechanisms and image sensors capturing the plurality of images,
        a speed of the farming machine,
        a processing time of the one or more images of the plurality of images,
        a treatment time representing an expected amount of time between actuating a treatment mechanism of the plurality of treatment mechanisms and delivery of a treatment to the plant, or
        a height of the plant.

10. The method of claim 1, further comprising:
    comparing the active region in the plurality of images to a predetermined target active region of the farming machine; and
    responsive to identifying that the active region that the plurality of treatment mechanisms is configured to treat is not the same as the predetermined target active region, modifying a configuration of the farming machine to align the modified active region with the predetermined target active region.

11. The method of claim 10, wherein the predetermined target active region is determined based on one or more of:
    a portion of the field that is a target size and a target shape;
    a target near boundary;
    a target far boundary;
    a target number of overlap regions;
    a target size of overlap regions;
    a target distance from the overlap regions to the plurality of treatment mechanisms; and
    a height of the plant.

12. The method of claim 10, further comprising:
    continuously modifying the configuration of the farming machine to align the active region with the predetermined target active region.

13. The method of claim 1, wherein the tilt angle is any of:
   an angle between a front surface of the plurality of image sensors and the field,
   a virtual angle in an image of the plurality of images, the virtual angle representative of a quantification of a projection of a field of view of the plurality of image sensors on a sensor array, and
   an angle between the sensor array and the field.

14. The method of claim 1, wherein:
   one or more image sensors capturing the plurality of images are rolling shutter image sensors, each rolling shutter image sensor capturing a plurality of image portions of an image over a period of time, and
   a controller generates the tiled image from a first image portion of the plurality of image portions and identifies the plant in the tiled image.

15. The method of claim 14, wherein the controller generates a second tiled image from a second image portion of the plurality of image portions and identifies a second plant to treat in the second tiled image the first image portion corresponding to a first portion of the field at a first distance from the farming machine and the second image portion corresponding to a second portion of the field at a second distance from the farming machine less than the first distance.

16. The method of claim 14, wherein:
   the controller generates a second tiled image from a second image portion of the plurality of image portions and identifies a second plant to treat in the second tiled image,
   the first image portion corresponding to a first portion of the field at a first distance from the farming machine and the second image portion corresponding to a second portion of the field at a second distance from the farming machine less than the first distance, and
   the controller generates the second tiled image faster than the first tiled image.

17. The method of claim 14, wherein the one or more image sensors have different tilt angles.

18. The method of claim 14, wherein a first set of images and a second set of images in the plurality of images are interleaved from a first image sensor and a second image sensor of the one or more image sensors.

19. The method of claim 1, wherein the plurality of images comprises:
   a first set of images captured by a first image sensor of the plurality of image sensors having a first tilt angle of less than 35 degrees relative to a vector orthogonal to a direction of travel of the farming machine; and
   a second set of images captured by a second image sensor of the plurality of image sensors having a second tilt angle greater or equal to 35 degrees relative to the vector, and
   wherein a controller generates the tiled image using the first set of images and identifies the plant from the tiled image.

20. A farming machine comprising:
   an image acquisition system comprising a plurality of image sensors tilted towards a field, the plurality of image sensors configured to capture a plurality of images of the field;
   a plurality of plant treatment mechanisms for treating plants in the field as the farming machine moves past the plants in the field; and
   a controller configured to:
      access the plurality of images captured by the image acquisition system, the plurality of images including a plurality of active pixels representing an active region for treating the plant in the field and a plurality of remaining pixels, the active region affected by a configuration of mechanized components of the farming machine;
      responsive to the configuration of mechanized components of the farming machine being modified, determining a modified active region based on the modified configuration;
      generate a tiled image from the plurality of images, by:
         identifying the modified active region in the plurality of images;
         generating a plurality of cropped images, the plurality of cropped images including the active pixels corresponding to the modified active region; and
         generating the tiled image including the modified active region by stitching together the active pixels in the plurality of cropped images;
      identify the plant in the tiled image; and
      actuate a plurality of treatment mechanisms to treat the plant as the farming machine travels past the plant in the field.

* * * * *